US011328446B2

(12) United States Patent
Tan et al.

(10) Patent No.: US 11,328,446 B2
(45) Date of Patent: May 10, 2022

(54) COMBINING LIGHT-FIELD DATA WITH ACTIVE DEPTH DATA FOR DEPTH MAP GENERATION

(71) Applicant: Google LLC, Mountain View, CA (US)

(72) Inventors: Jie Tan, Foster City, CA (US); Gang Pan, Fremont, CA (US); Jon Karafin, Morgan Hill, CA (US); Thomas Nonn, Berkeley, CA (US); Julio C. Hernandez Zaragoza, Mountain View, CA (US)

(73) Assignee: Google LLC, Mountain View, CA (US)

( * ) Notice: Subject to any disclaimer, the term of this patent is extended or adjusted under 35 U.S.C. 154(b) by 727 days.

(21) Appl. No.: 15/635,894

(22) Filed: Jun. 28, 2017

(65) Prior Publication Data

US 2017/0365068 A1    Dec. 21, 2017

Related U.S. Application Data

(63) Continuation-in-part of application No. 15/451,831, filed on Mar. 7, 2017, and a continuation-in-part of
(Continued)

(51) Int. Cl.
*G06T 7/80* (2017.01)
*G06T 3/00* (2006.01)
(Continued)

(52) U.S. Cl.
CPC .............. *G06T 7/80* (2017.01); *G01S 17/08* (2013.01); *G01S 17/42* (2013.01); *G01S 17/86* (2020.01);
(Continued)

(58) Field of Classification Search
None
See application file for complete search history.

(56) References Cited

U.S. PATENT DOCUMENTS

| 725,567 A | 4/1903 | Ives |
| 4,383,170 A | 5/1983 | Takagi et al. |

(Continued)

FOREIGN PATENT DOCUMENTS

| CN | 101226292 | 7/2008 |
| CN | 101309359 | 11/2008 |

(Continued)

OTHER PUBLICATIONS

Park, Yoonsu & Yun, Seokmin & Won, Chee & Cho, Kyungeun & Um, Kyhyun & Sim, Sungdae. (2014). Calibration between Color Camera and 3D Lidar Instruments with a Polygonal Planar Board. Sensors (Basel, Switzerland). 14. 5333-5353. 10.3390/s140305333.*

(Continued)

*Primary Examiner* — Kaitlin A Retallick

(57) ABSTRACT

Depths of one or more objects in a scene may be measured with enhanced accuracy through the use of a light-field camera and a depth sensor. The light-field camera may capture a light-field image of the scene. The depth sensor may capture depth sensor data of the scene. Light-field depth data may be extracted from the light-field image and used, in combination with the sensor depth data, to generate a depth map indicative of distance between the light-field camera and one or more objects in the scene. The depth sensor may be an active depth sensor that transmits electromagnetic energy toward the scene; the electromagnetic energy may be reflected off of the scene and detected by the active depth sensor. The active depth sensor may have a 360° field of view; accordingly, one or more mirrors may be used to direct the electromagnetic energy between the active depth sensor and the scene.

21 Claims, 19 Drawing Sheets

Related U.S. Application Data application No. 15/098,674, filed on Apr. 14, 2016, now abandoned, and a continuation-in-part of application No. 14/834,924, filed on Aug. 25, 2015.

(60) Provisional application No. 62/359,022, filed on Jul. 6, 2016, provisional application No. 62/305,917, filed on Mar. 9, 2016, provisional application No. 62/200,804, filed on Aug. 4, 2015, provisional application No. 62/148,055, filed on Apr. 15, 2015.

(51) Int. Cl.
*G06T 7/521* (2017.01)
*G06K 9/46* (2006.01)
*G01S 17/08* (2006.01)
*G01S 17/42* (2006.01)
*H04N 13/271* (2018.01)
*G01S 17/86* (2020.01)
*H04N 13/232* (2018.01)

(52) U.S. Cl.
CPC .......... *G06K 9/4604* (2013.01); *G06T 3/0068* (2013.01); *G06T 7/521* (2017.01); *H04N 13/271* (2018.05); *H04N 13/232* (2018.05)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |

(56) References Cited

U.S. PATENT DOCUMENTS

| | | |
|---|---|---|
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,860,856 B2 | 10/2014 | Wetsztein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerino et al. |
| 2004/0012689 A1 | 1/2004 | Tinnerino et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |

(56) References Cited

U.S. PATENT DOCUMENTS

| | | |
|---|---|---|
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0278382 A1 | 11/2010 | Chapman et al. |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0210969 A1 | 9/2011 | Barenbrug |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0133649 A1 | 12/2011 | Bales et al. |
| 2011/0292258 A1 | 12/2011 | Adler |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0010077 A1* | 1/2013 | Nguyen ............ H04N 13/261 348/46 |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0060540 A1* | 3/2013 | Frahm ............... G06T 17/05 703/2 |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0208083 A1* | 8/2013 | Li ............... H04N 5/23238 348/36 |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0258451 A1 | 10/2013 | El-Ghoroury et al. |
| 2013/0262511 A1 | 10/2013 | Kuffner et al. |
| 2013/0286236 A1 | 10/2013 | Wankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0049765 A1* | 2/2014 | Zheleznyak ............ G01S 17/89 356/4.02 |
| 2014/0059462 A1 | 2/2014 | Wernersson |
| 2014/0071234 A1* | 3/2014 | Millett ............... G01S 17/89 348/43 |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168415 A1* | 6/2014 | Ihlenburg ............ H04N 5/232 348/118 |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |

(56) References Cited

U.S. PATENT DOCUMENTS

| | | |
|---|---|---|
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0218718 A1* | 8/2014 | Mander ............ G01N 21/31 356/51 |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2014/0375613 A1* | 12/2014 | Spears ............ G06F 3/0428 345/175 |
| 2015/0024336 A1 | 1/2015 | Blassnig et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0146051 A1 | 5/2015 | Abe et al. |
| 2015/0170371 A1 | 6/2015 | Muninder et al. |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0104101 A1 | 10/2015 | Bryant et al. |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0370011 A1 | 12/2015 | Ishihara |
| 2015/0370012 A1 | 12/2015 | Ishihara |
| 2016/0029017 A1 | 1/2016 | Liang |
| 2016/0048970 A1* | 2/2016 | Loghman ............ G06T 7/593 382/154 |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0330434 A1 | 11/2016 | Chen |
| 2016/0353026 A1 | 12/2016 | Blonde et al. |
| 2016/0381348 A1 | 12/2016 | Hayasaka |
| 2017/0059305 A1 | 3/2017 | Nonn et al. |
| 2017/0061635 A1 | 3/2017 | Oberheu et al. |
| 2017/0067832 A1 | 3/2017 | Ferrara, Jr. et al. |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0358092 A1 | 12/2017 | Bleibel et al. |
| 2018/0012397 A1 | 1/2018 | Carothers |
| 2018/0020204 A1 | 1/2018 | Pang et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0139431 A1* | 5/2018 | Simek ............ H04N 5/2258 |
| 2018/0158198 A1 | 6/2018 | Kamad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011029209 | 3/2011 |
| WO | 2011030234 | 3/2011 |
| WO | 2011081187 | 7/2011 |

OTHER PUBLICATIONS

Georgiev, T., et al., "Suppersolution with Plenoptic 2.0 Cameras," Optical Society of America 2009; pp. 1-3.

Georgiev, T., et al., "Unified Frequency Domain Analysis of Lightfield Cameras" (2008).

Georgiev, T., et al., Plenoptic Camera 2.0 (2008).

Girod, B., "Mobile Visual Search", IEEE Signal Processing Magazine, Jul. 2011.

Gortler et al., "The lumigraph" SIGGRAPH 96, pp. 43-54.

Groen et al., "A Comparison of Different Focus Functions for Use in Autofocus Algorithms," Cytometry 6:81-91, 1985.

Haeberli, Paul "A Multifocus Method for Controlling Depth of Field" GRAPHICA Obscura, 1994, pp. 1-3.

Heide, F. et al., "High-Quality Computational Imaging Through Simple Lenses," ACM Transactions on Graphics, SIGGRAPH 2013; pp. 1-7.

Heidelberg Collaboratory for Image Processing, "Consistent Depth Estimation in a 4D Light Field," May 2013.

Hirigoyen, F., et al., "1.1 um Backside Imager vs Frontside Image: an optics-dedicated FDTD approach", IEEE 2009 International Image Sensor Workshop.

Huang, Fu-Chung et al., "Eyeglasses-free Display: Towards Correcting Visual Aberrations with Computational Light Field Displays," ACM Transaction on Graphics, Aug. 2014, pp. 1-12.

Isaksen, A., et al., "Dynamically Reparameterized Light Fields," SIGGRAPH 2000, pp. 297-306.

Ives H., "Optical properties of a Lippman lenticulated sheet," J. Opt. Soc. Am. 21, 171 (1931).

Ives, H. "Parallax Panoramagrams Made with a Large Diameter Lens", Journal of the Optical Society of America; 1930.

Jackson et al., "Selection of a Convolution Function for Fourier Inversion Using Gridding" IEEE Transactions on Medical Imaging, Sep. 1991, vol. 10, No. 3, pp. 473-478.

Kautz, J., et al., "Fast arbitrary BRDF shading for low-frequency lighting using spherical harmonics", in Eurographic Rendering Workshop 2002, 291-296.

Koltun, et al., "Virtual Occluders: An Efficient Interediate PVS Representation", Rendering Techniques 2000: Proc. 11th Eurographics Workshop Rendering, pp. 59-70, Jun. 2000.

Kopf, J., et al., Deep Photo: Model-Based Photograph Enhancement and Viewing, SIGGRAPH Asia 2008.

Lehtinen, J., et al. "Matrix radiance transfer", in Symposium on Interactive 3D Graphics, 59-64, 2003.

Lesser, Michael, "Back-Side Illumination", 2009.

Levin, A., et al., "Image and Depth from a Conventional Camera with a Coded Aperture", SIGGRAPH 2007, pp. 1-9.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Levoy, M. "Light Field Photography and Videography," Oct. 18, 2005.

Levoy, M. "Stanford Light Field Microscope Project," 2008; http://graphics.stanford.edu/projects/lfmicroscope/, 4 pages.

(56) References Cited

OTHER PUBLICATIONS

Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7, 4, Mar. 1908, pp. 821-825.
Lumsdaine et al., "Full Resolution Lightfield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Marshall, Richard J., et al., "Improving Depth Estimation from a Plenoptic Camera by Patterned Illumination", Proc. of SPIE, vol. 9528, 2015, pp. 1-6.
Tao, Michael, et al., "Depth from Combining Defocus and Correspondence Using Light-Field Cameras", Dec. 2013.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al.," A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image SensorWorkshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality With 6 Degrees of Freesom From Limited Viewer Data".

(56) References Cited

OTHER PUBLICATIONS

U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-Mew Contour Tracking".
U.S. Appl. No. 15/897,942, filed Feb. 15, 2018 listing Francois Bleibel et al. as inventors, entitled "Multi-Mew Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elementsof early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "Gradientshop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al., "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995 pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photograohy" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.

(56) References Cited

OTHER PUBLICATIONS

Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", Acm Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.

\* cited by examiner

3D View
Conic Design

3D View
Pyramid Design

Output confined to 30 deg (+/-15 deg) circular emission. Note: extremes of laser (1, -1, 15, -15 deg) traced. Laser rotated through 360 degrees.

Output: 90 deg x 60 deg (+/-45 x +/-30).

3D View
(Multi-facet Design)

COMBINING LIGHT-FIELD DATA WITH ACTIVE DEPTH DATA FOR DEPTH MAP GENERATION

CROSS-REFERENCE TO RELATED APPLICATIONS

The present application claims the benefit of U.S. Provisional Patent Application Ser. No. 62/359,022 for "Combining Light-Field Data with Active Depth Data for Depth Map Generation,", filed Jul. 6, 2016, the disclosure of which is incorporated herein by reference in its entirety.

The present application is also a continuation-in-part of U.S. patent application Ser. No. 14/834,924 for "Active Illumination for Enhanced Depth Map Generation,", filed Aug. 25, 2015, the disclosure of which is incorporated herein by reference in its entirety.

The present application is also a continuation-in-part of U.S. patent application Ser. No. 15/451,831 for "Video Capture, Processing, Calibration, Computational Fiber Artifact Removal, and Light-field Pipeline,", filed Mar. 7, 2017, the disclosure of which is incorporated herein by reference in its entirety.

U.S. patent application Ser. No. 15/451,831 claims the benefit of U.S. Provisional Patent Application Ser. No. 62/305,917 for "Video Capture, Processing, Calibration, Computational Fiber Artifact Removal, and Light-field Pipeline,", filed Mar. 9, 2016, the disclosure of which is incorporated herein by reference in its entirety.

U.S. patent application Ser. No. 15/451,831 is also a continuation-in-part of U.S. patent application Ser. No. 15/098,674 for "Light Guided Image Plane Tiled Arrays with Dense Fiber Optic Bundles for Light-Field and High Resolution Image Acquisition,", filed Apr. 14, 2016, the disclosure of which is incorporated herein by reference in its entirety.

U.S. patent application Ser. No. 15/098,674 claims the benefit of U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

U.S. patent application Ser. No. 15/098,674 also claims the benefit of U.S. Provisional Application Ser. No. 62/200,804 for "Light Guided Image Plane Tiled Arrays with Dense Fiber Optic Bundles for Light-Field Display", filed Aug. 4, 2015, the disclosure of which is incorporated herein by reference in its entirety.

U.S. patent application Ser. No. 15/098,674 also claims the benefit of U.S. Provisional Application Ser. No. 62/305,917 for "Video Capture, Processing, Calibration, Computational Fiber Artifact Removal, and Light-field Pipeline", filed Mar. 9, 2016, the disclosure of which is incorporated herein by reference in its entirety.

This application is further related to U.S. patent application Ser. No. 13/774,971 for "Compensating for Variation in Microlens Position During Light-Field Image Processing,", filed Feb. 22, 2013, the disclosure of which is incorporated herein by reference in its entirety.

TECHNICAL FIELD

The present disclosure relates to digital imaging. More precisely, the present disclosure relates to improved techniques for depth map generation.

BACKGROUND

Active depth sensors are technologies that can measure the position of points in space. Examples include Light Detection and Ranging (LiDAR), Time of Flight (ToF) cameras such as the Kinect sensor available from Microsoft Corporation of Redmond, Wash., and/or the like. Accurate depth data can be used in many different industries, including, for example, computer vision (3D reconstruction, image/video segmentation, scene understanding), visual effects (camera tracking, relighting, compositing CG contents) and virtual/augmented reality.

Light-field technologies are able to generate imagery that can be used in order to produce a high resolution depth map. However, the obtained depth maps may, in some circumstances, lack accuracy, especially at regions where there is no texture or features that can aid in generation of the depth map. By contrast, known active depth sensors often provide depth information that is relatively low in resolution. Thus, neither the depth information obtained from a light-field image, nor that gathered from active depth sensors can, alone, provide accurate and high-resolution depth maps. This limits the role that depth information can play in the applications listed above.

SUMMARY

According to various embodiments, the system and method described herein provide enhanced depth map generation. Although the depth map generation afforded by light-field image processing can be inaccurate, the depth measurements from active depth sensing technologies can be highly accurate. Various embodiments described herein provide techniques for incorporating such depth measurements in order to improve and/or complement the depth maps obtained from light-field data.

For example, in some embodiments, LiDAR technologies can sense close and far away objects but, in general, the resolution (i.e., the number of 3D points they generate) is usually low. As another example, Time of Flight technologies usually generate a higher number of points, but the sensing range may be short (0.5-10 meters). Thus, depending on the application, one active depth sensing technology can be favored over the other, or they can also be combined with one another in order to achieve the desired effect or depth map accuracy.

In at least one embodiment, active depth sensing data can be combined with a light-field depth map so as to provide improved depth map generation. Sensor fusion techniques can be used to dramatically increase both the resolution and the accuracy of the depth maps.

For example, a light-field camera may capture a light-field image of the scene, and a depth sensor may capture depth sensor data of the scene. Light-field depth data may be extracted from the light-field image and used, in combination with the sensor depth data, to generate a depth map indicative of distance between the light-field camera and one or more objects in the scene.

The depth sensor may be an active depth sensor that transmits electromagnetic energy toward the scene; the electromagnetic energy may be reflected off of the scene and detected by the active depth sensor. For example, the active depth sensor may include LiDAR and/or Time of Flight technologies.

The active depth sensor may have a 360° field of view; accordingly, one or more mirrors may be used to direct the electromagnetic energy between the active depth sensor and the scene. The active depth sensor may emit electromagnetic energy generally radially at the mirror(s), and the mirrors may reflect the electromagnetic energy toward the scene. The electromagnetic energy may reflect off of the scene, back toward the mirror(s). Then, the mirrors may reflect the electromagnetic energy back toward the active depth sensor. The mirror(s) may be arranged in any of various shapes, including but not limited to conical, pyramidal, and multi-faceted shapes.

Using the light-field depth data and the depth sensor data to generate the depth map may include calibrating the light-field camera and/or the depth sensor to generate a correspondence between the sensor depth data and the light-field image, and applying a depth map generation algorithm to combine the sensor depth data with the light-field depth data. Calibrating the light-field camera and/or the depth sensor may include calibrating the mirror(s) by using the depth sensor to capture depth calibration data of a calibration scene containing a planar board positioned at one or more known orientations, and using the depth calibration data to ascertain locations of corners of the planar board in each of the one or more known orientations. The light-field camera may also be calibrated by capturing light-field calibration data of the calibration scene contemporaneously with capture of the depth calibration data, and establishing settings for the light-field camera in which the corners in the light-field calibration data are aligned with the corners in the depth calibration data.

Using the light-field depth data and the depth sensor data to generate the depth map may include creating a 3D data cost function based on multi-view geometry, applying heuristics to improve the 3D data cost function, and applying global optimization to generate the depth map using a Markov Random Field solution. These concepts will be described in greater detail below.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

Figure 1:
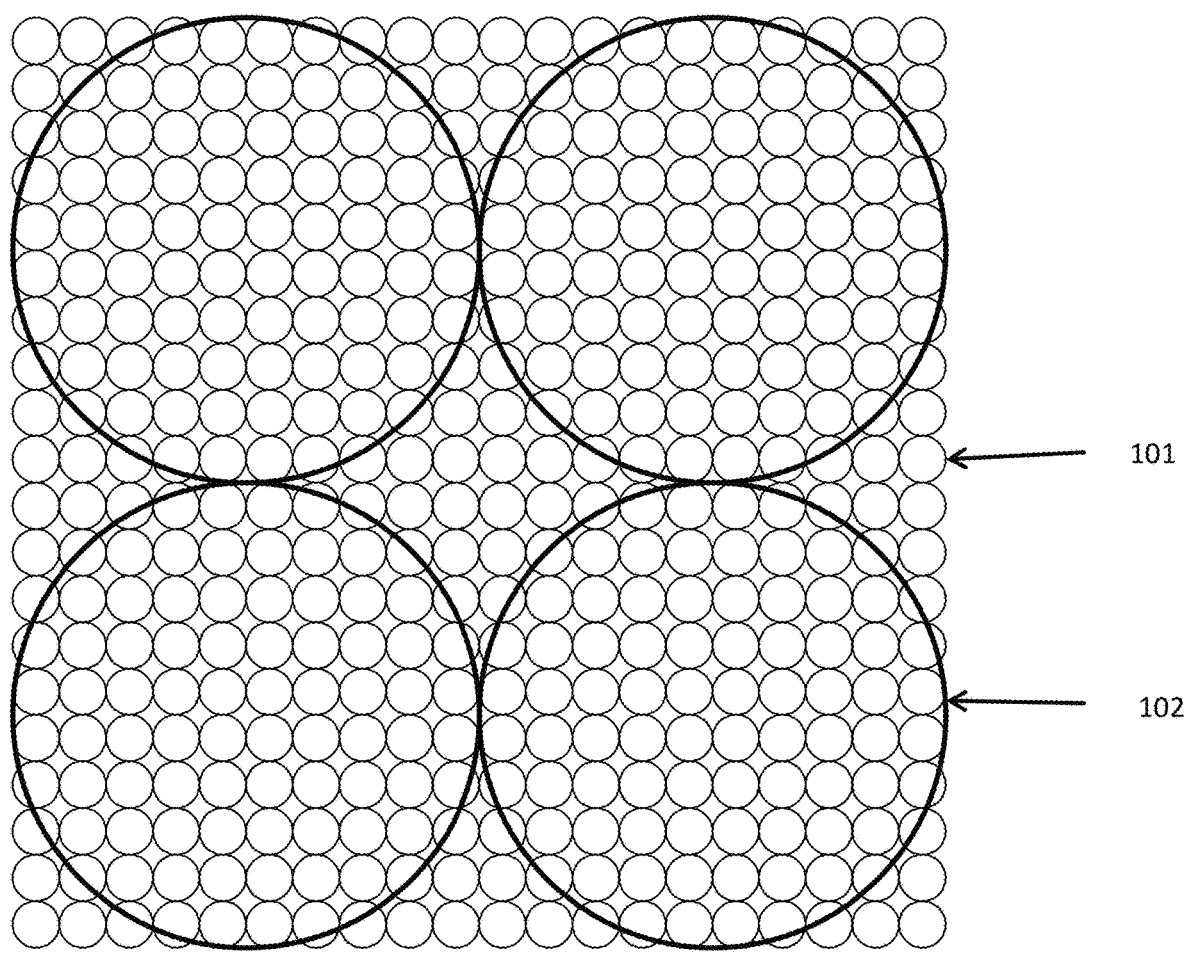
FIG. 1 depicts a portion of a light-field image.

For purposes of the description provided herein, the following definitions are used:

Active depth sensor: a depth sensor that transmits at least a portion of the energy that it will use to detect depth.

Conical shape: a 3D shape resembling a cone.

Conventional image: an image in which the pixel values are not, collectively or individually, indicative of the angle of incidence at which light is received by a camera.

Depth: a representation of distance between an object and/or corresponding image sample and a camera or camera element, such as the microlens array of a plenoptic light-field camera.

Depth map: an image indicative of the relative depths of objects and/or elements appearing in the depth map; typically used in conjunction with a conventional or light-field image to indicate the depth of objects appearing in the image.

Depth sensor: a sensor that detects the depth of one or more objects in a scene.

Disk: a region in a light-field image that is illuminated by light passing through a single microlens; may be circular or any other suitable shape.

Facet: a generally planar surface, such as a planar mirror present in a reflector with other mirrors.

Image: a two-dimensional array of pixel values, or pixels, each specifying a color.

Input device: any device that receives input from a user.

Light-field camera: any camera capable of capturing light-field images.

Light-field data: data indicative of the angle of incidence at which light is received by a camera.

Light-field image: an image that contains a representation of light-field data captured at the sensor.

Main lens: a lens or set of lenses that directs light from a scene toward an image sensor.

Microlens: a small lens, typically one in an array of similar microlenses.

Microlens array: an array of microlenses arranged in a predetermined pattern.

Mirror: an object that has a surface that is at least partially reflective of light.

Multi-faceted shape: a 3D shape with multiple facets, which may be, but are not required to, define a pyramidal shape.

Pyramidal shape: a 3D shape in which multiple facets join at a single point, typically with a planar (solid or open) base opposite the single point Reflector: one or more mirrors.

Scene: a collection of one or more objects to be imaged and/or modeled.

Sensor, or "image sensor": a light detector in a camera capable of generating electrical signals based on light received by the sensor.

In addition to the foregoing, additional terms will be set forth and defined in the description below. Terms not explicitly defined are to be interpreted, primarily, in a manner consistently with their usage and context herein, and, secondarily, in a manner consistent with their use in the art.

For ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another. Further, many of the configurations and techniques described herein are applicable to conventional imaging as well as light-field imaging. Thus, although the following description focuses on light-field imaging, all of the following systems and methods may additionally or alternatively be used in connection with conventional digital imaging systems. In some cases, the needed modification is as simple as removing the microlens array from the configuration described for light-field imaging to convert the example into a configuration for conventional image capture.

Architecture

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Further, any known depth sensing technology may be used.

Figure 2:
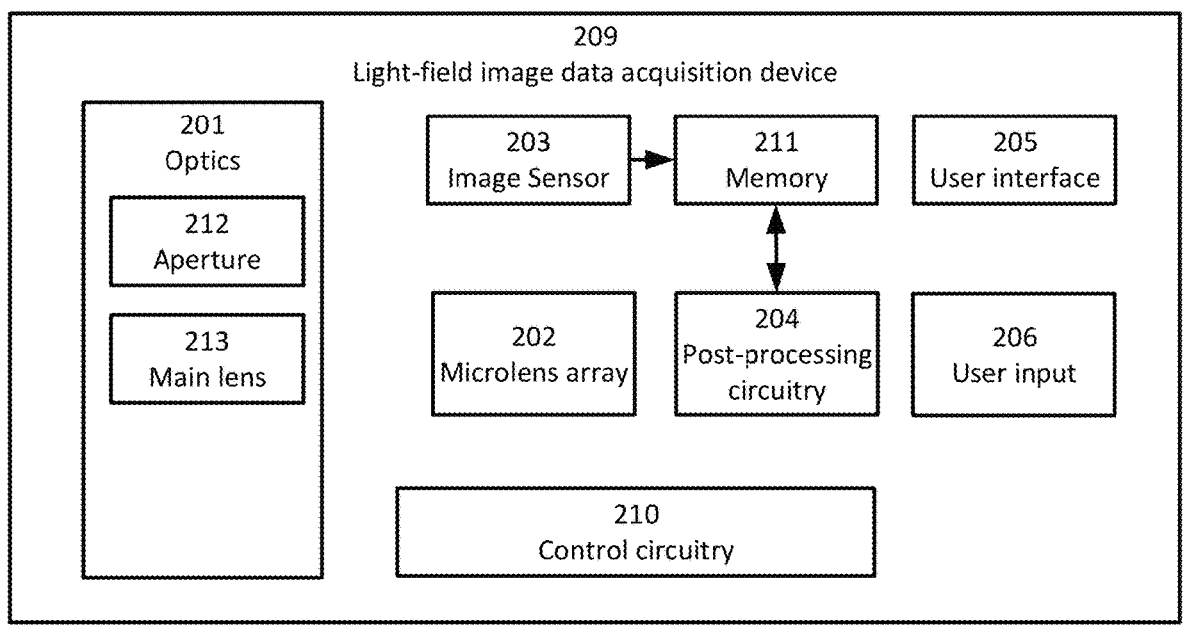
FIG. 2 depicts an example of an architecture for implementing the methods of the present disclosure in a light-field capture device, according to one embodiment.
Figure 2:
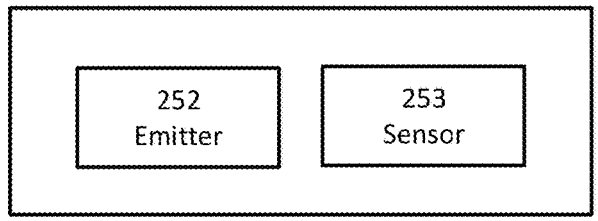
Figure 3:
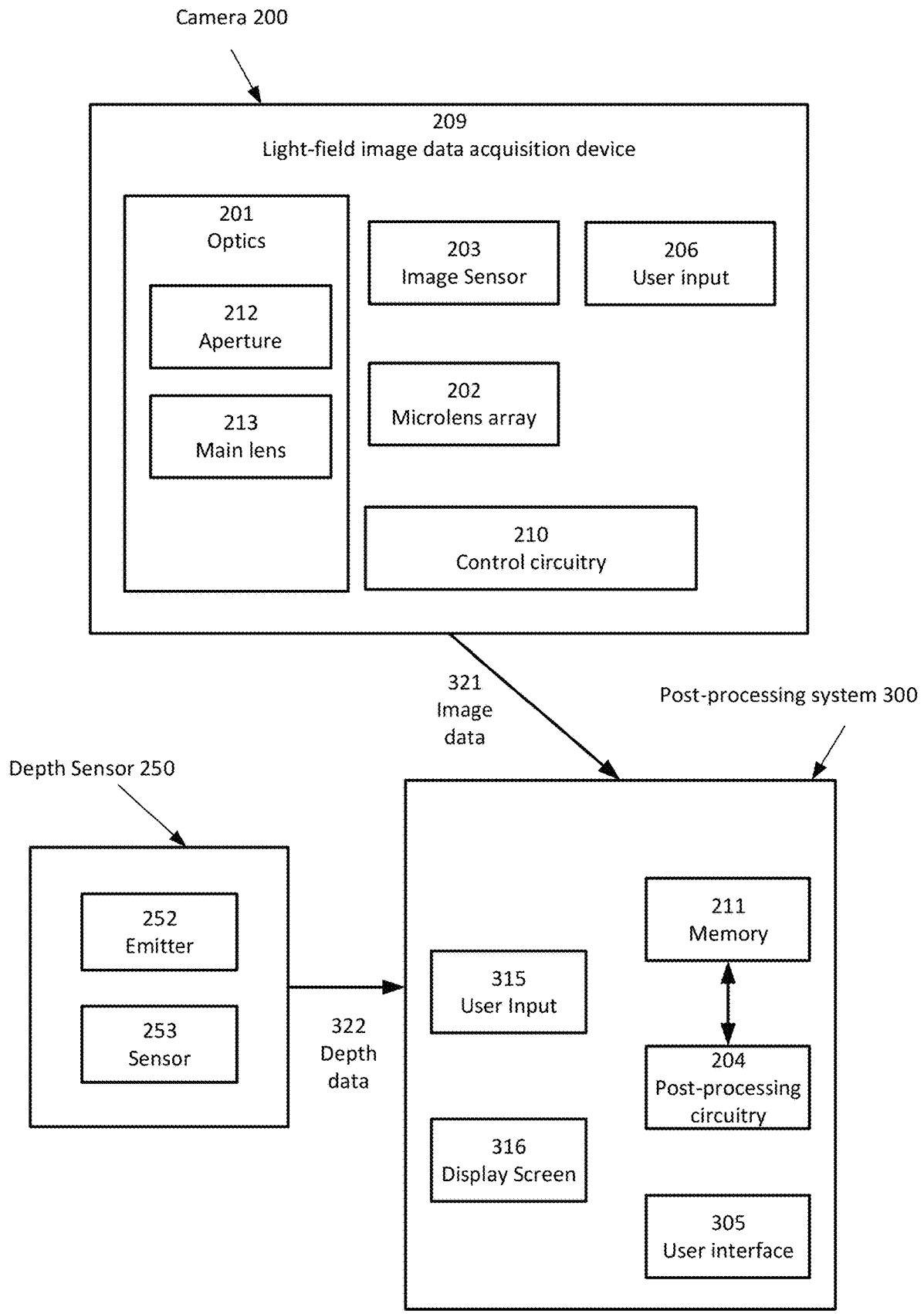
FIG. 3 depicts an example of an architecture for implementing the methods of the present disclosure in a post-processing system communicatively coupled to a light-field capture device, according to one embodiment.

Referring now to FIG. 2, there is shown a block diagram depicting an architecture for implementing the method of the present disclosure in a light-field capture device such as a camera 200, and in a depth sensor 250. Referring now also to FIG. 3, there is shown a block diagram depicting an architecture for implementing the method of the present disclosure in a post-processing system 300 communicatively coupled to a light-field capture device such as a camera 200 and/or a depth sensor such as the depth sensor 250, according to one embodiment. One skilled in the art will recognize that the particular configurations shown in FIGS. 2 and 3 are merely exemplary, and that other architectures are possible for camera 200, depth sensor 250, and post-processing system 300. One skilled in the art will further recognize that several of the components shown in the configurations of FIGS. 2 and 3 are optional, and may be omitted or reconfigured.

Figure 4:
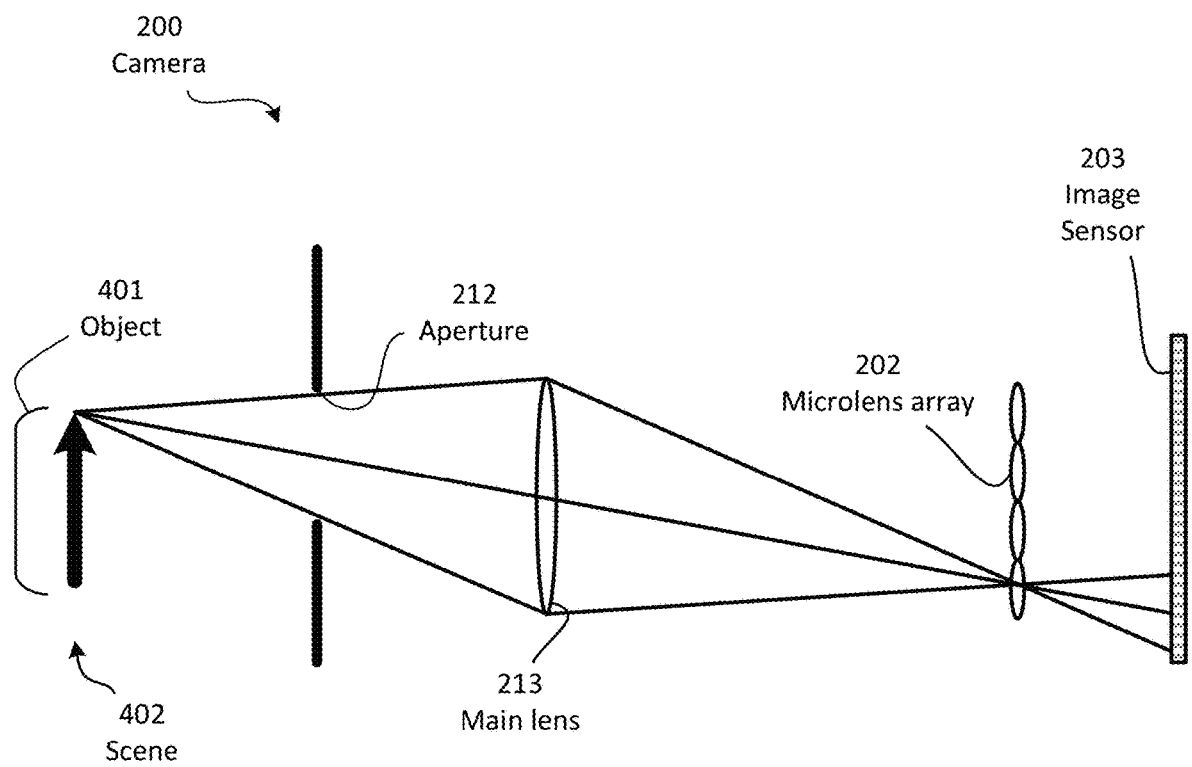
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. Referring now also to FIG. 4, there is shown an example of an architecture for a light-field camera, or camera 200, for implementing the method of the present disclosure according to one embodiment. The Fig. is not shown to scale. FIG. 4 shows, in conceptual form, the relationship between aperture 212, main lens 213, microlens array 202, and image sensor 203, as such components interact to capture light-field data for one or more objects, represented by an object 401, which may be part of a scene 402.

In at least one embodiment, camera 200 may also include a user interface 205 for allowing a user to provide input for controlling the operation of camera 200 for capturing, acquiring, storing, and/or processing image data. The user interface 205 may receive user input from the user via an input device 206, which may include any one or more user input mechanisms known in the art. For example, the input device 206 may include one or more buttons, switches, touch screens, gesture interpretation devices, pointing devices, and/or the like.

Further, in at least one embodiment, depth sensor 250 may be an active depth sensor that not only senses electromagnetic energy, but also emits the electromagnetic energy toward a scene for which depth information is desired. Thus, the depth sensor 250 may have an emitter 252 that emits the electromagnetic energy, and a sensor 253 that receives the electromagnetic energy after it has been reflected off of the scene. The depth sensor 250 may be of any known type, including but not limited to LiDAR and Time of Flight depth sensing devices.

Similarly, in at least one embodiment, post-processing system 300 may include a user interface 305 that allows the user to provide input to switch image capture modes, as will be set forth subsequently. The user interface 305 may additionally or alternatively facilitate the receipt of user input from the user to establish one or more other image capture parameters.

In at least one embodiment, camera 200 may also include control circuitry 210 for facilitating acquisition, sampling, recording, and/or obtaining light-field image data. The control circuitry 210 may, in particular, be used to switch image capture configurations such as the zoom level, resolution level, focus, and/or aperture size in response to receipt of the corresponding user input. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol may be used for transmitting image data 321 to circuitry 204; for example, the camera 200 can transmit image data 321 and/or other data via the Internet, a cellular data network, a Wi-Fi network, a Bluetooth communication protocol, and/or any other suitable means. Likewise, any suitable wired or wireless protocol may be used by the depth sensor 250 to transmit the depth data 322 and/or other data to circuitry 204.

Such a separate component may include any of a wide variety of computing devices, including but not limited to computers, smartphones, tablets, cameras, and/or any other device that processes digital information. Such a separate component may include additional features such as a user input 315 and/or a display screen 316. If desired, light-field image data may be displayed for the user on the display screen 316.

Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing,", filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Active Depth Sensing

As mentioned previously, data from an active sensor may be combined with the depth maps generated from light-field data to obtain more accurate depth maps. In at least one embodiment, the system includes an active depth sensor that estimates distance by emitting a laser or light pulse (for example, at an infra-red wavelength) and measuring the time it gets reflected back to the sensor.

Figure 5:
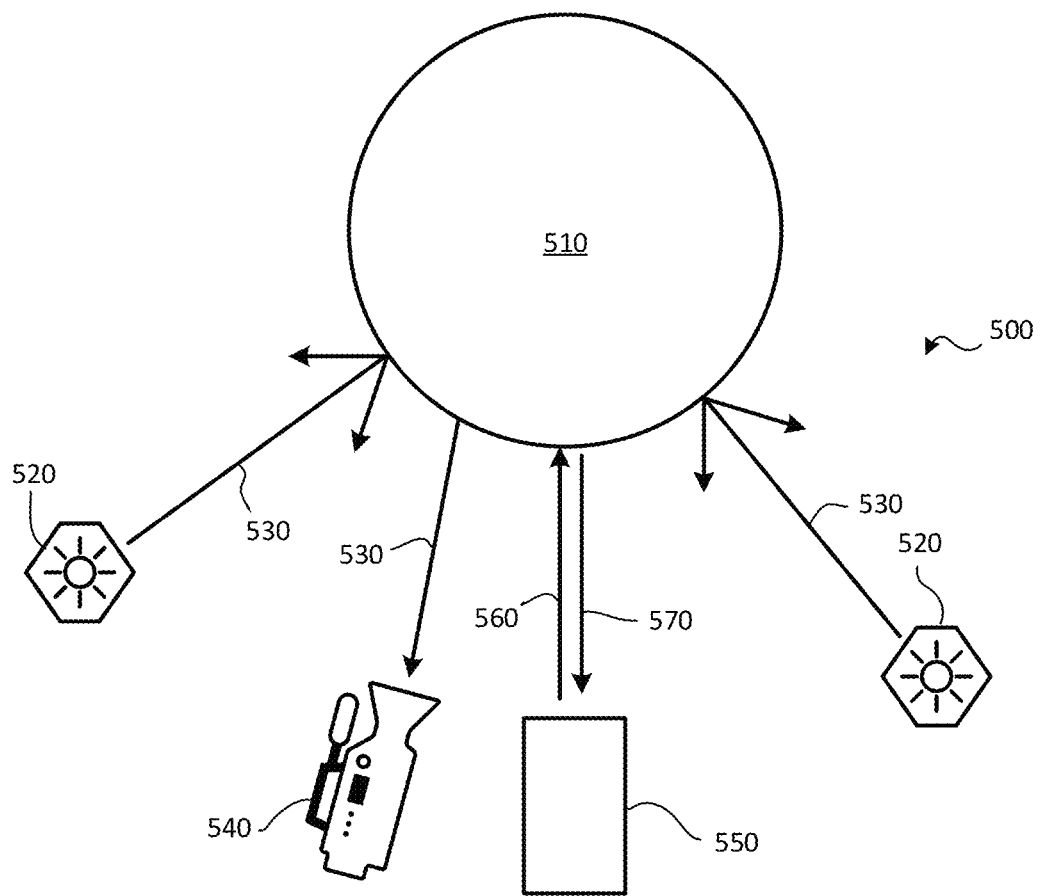
FIG. 5 is a schematic view of a system for imaging and depth determination, according to one embodiment.

Referring to FIG. 5, a system 500 for imaging and depth determination is depicted, according to one embodiment. The system 500 may be designed to capture light-field images and or video of a scene 510. The scene 510 may be illuminated by one or more visible light sources 520, each of which may project visible light 530 at the scene 510. The system may include a light-field camera 540 and an active depth sensor 550.

The light-field camera 540 may be of any known type. In some embodiments, the light-field camera 540 may be a plenoptic light-field camera, such as the camera 200 of FIGS. 2 and 3. In alternative embodiments, the light-field camera 540 may be a different type of light-field camera, such as a tiled array of conventional cameras that, combined, capture visible light to generate light-field images and/or video. The light-field camera 540 may receive visible light 530 from the scene 510 to generate the light-field images and/or video.

The active depth sensor 550 may be any type of active depth sensor. The active depth sensor 550 may estimate distance by emitting a laser or light pulse (for example, at an infrared wavelength) and measure the time required for the light pulse to be reflected back to the active depth sensor 550. In some embodiments, the active depth sensor 550 may be a Time of Flight sensor, a LiDAR sensor, and/or the like. The active depth sensor 550 may transmit electromagnetic energy 560, which may or may not have a frequency within the visible spectrum, toward the scene 510. The electromagnetic energy 560 may reflect from the scene 510 as reflected electromagnetic energy 570, which may then be received and detected by the active depth sensor 550. The resulting depth data may be used to enhance the accuracy of depth maps computed from the light-field images and/or video captured by the light-field camera 540.

In alternative embodiments, any type of depth sensor may be used in place of the active depth sensor 550. A depth sensor that is not an active depth sensor may not transmit its own electromagnetic energy, but may instead simply receive electromagnetic energy transmitted from other sources. For example, the light sources 520 may transmit electromagnetic energy, in the form of visible light and/or electromagnetic energy outside the visible spectrum, which can be detected by the depth sensor.

Depth sensors such as active depth sensors can be used to measure the depth profile of objects. Their use can add to the accuracy of the depth measurement derived from a light-field camera. This is especially true for imaging regions that are monochromatic and featureless. The active depth sensor 550 may help add detail to the depth maps generated by the light-field camera 540 alone. As mentioned above, active depth sensors can include, for example, Light Detector and Ranging (LiDAR) scanning devices and/or Time of Flight (ToF) cameras.

Many known LiDAR sensors are adapted to be used with autonomous vehicles and can emit laser pulses with a 360 degree horizontal field of view (FOV). In many such implementations, the horizontal resolution is 0.1°-0.4°, depending on the speed with which the laser emitter rotates. The accuracy of depth measurement can typically vary by up to 3 cm for a range up to 100-150 meters. For dark (e.g. black) surfaces, the measurement range is often dramatically decreased; for example, in some environments it has been observed that the LiDAR sensor measures up to 5 meters for black matte surfaces.

Many Time of Flight cameras make use of the known speed of light in order to calculate distances. This may be done by measuring the time of flight of a light signal between the camera and each point of the image. In a time of flight camera, the depth of the entire scene may be captured with each light pulse, as opposed to a point by point approach as in LiDAR systems. Another difference with respect to a LiDAR is that the FOV of a ToF system is usually forward facing, i.e., non-circular.

LiDAR and Time of Flight sensors are merely exemplary technologies that may be incorporated into the active depth sensor 550; other known technologies for sensing depth maybe used. Further, the characteristics and parameters described herein are merely exemplary. The techniques described herein can be implemented using equipment having other characteristics.

LiDAR Reflectors

Many commercially available active depth sensors make measurements over a field of view (FOV) that is much larger than a typical field of view for a light-field camera. For example, the Velodyne VLP-16 device scans with sixteen lasers in a circular 360° field of view in the plane of rotation (the "azimuthal coordinate") of the device, and +/−15° in the plane perpendicular to the plane of rotation (the "polar coordinate"). A photosensor, such as a photosensor that receives light through a tapered fiber optic bundle, as described in the above-referenced U.S. patent application Ser. No. 15/451,831, may be 560 mm by 316 mm, and may be used with a lens having a 1210 mm focal length; the corresponding field of view may be about 26° in the horizontal direction, and 15° in the vertical direction.

To measure depth of objects from a camera, it may be advantageous to reflect the beams of light from the active depth sensor 550 so that they are projected into a smaller angular region that more closely matches the field of view of the light-field camera 540. This technique may be used to avoid projecting the beams of light into places the light-field camera 540 cannot image, and instead redirect them to be more concentrated so the spatial sampling of the active depth sensor 550 within the field of view of the light-field camera 540 is increased. As previously mentioned, many active depth sensors, such as LiDAR sensors, have circular fields-of-view (FOVs). Accordingly, in at least one embodiment, the cylindrical FOV of the active depth sensing device is adapted to a forward-looking light-field capture system using a specialized mirror system that reflects and directs the active depth sensor samples to the front.

Figure 6:
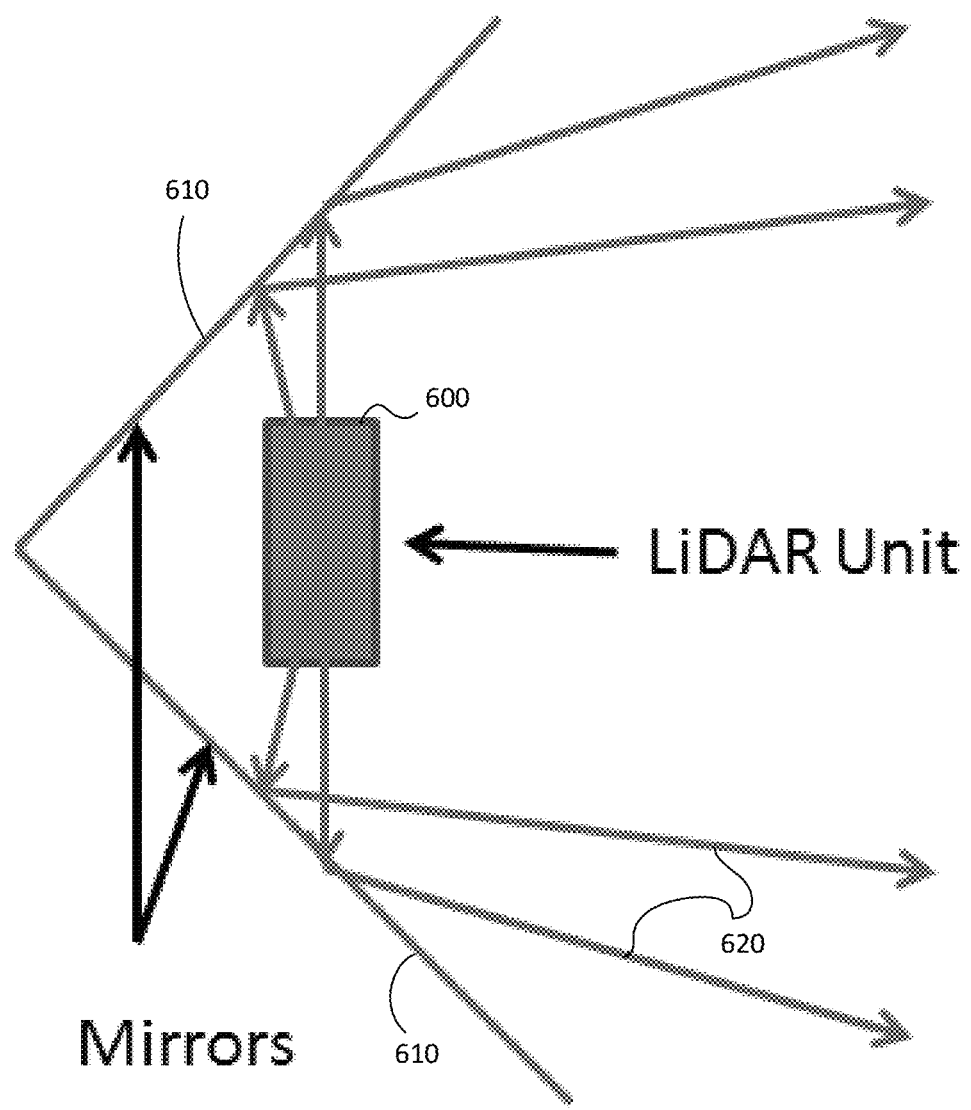
FIG. 6 is a side view of an active depth sensor placed between two mirrors placed at a 90° angle relative to one another, with the active depth sensor centered between them, projecting light beams radially such that the light beams are reflected by the mirrors, according to one embodiment.
Figure 7A:
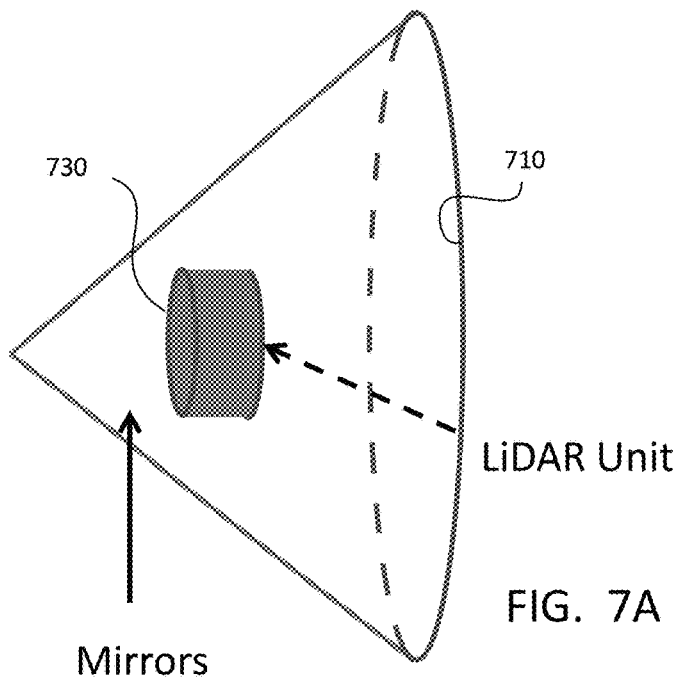
FIGS. 7A and 7B depict two different mirror reflector designs with a reflective surface that is, respectively, cone-shaped on the inside, with a circular opening, and pyramidal with four mirrors placed in a pyramid formation with a square opening, according to certain embodiments.
Figure 7B:
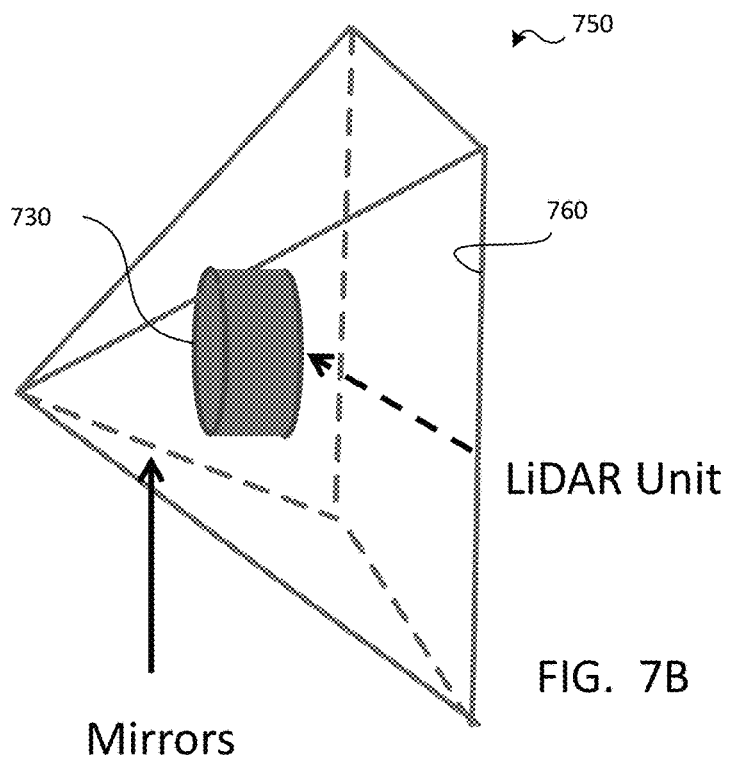

FIGS. 6, 7A, and 7B depict exemplary architectures for mirror designs to concentrate samples from an active depth sensor system such as LiDAR. The embodiments of FIGS. 6 and 7B have mirror systems with four planar mirrors, arranged in a pyramidal shape. FIG. 7A depicts a variation wherein a conical design is used for the mirror, which in some cases can better facilitate use of all of the LiDAR samples.

Specifically, FIG. 6 is a side view of an active depth sensor 600 placed between two mirrors 610. The two mirrors 610 may be placed at a 90° angle relative to one another, with the active depth sensor 600 centered between them, projecting light beams 620 radially. In at least one embodiment, the active depth sensor 600 may be a Velodyne VLP-16 LiDAR disk that projects 16 lasers radially with various angles (for example, −15°, −13°, −11°, −9°, −7°, −5°, −3°, −1°, 1°, 3°, 5°, 7°, 9°, 11°, 13°, and 15°) relative to the plane of rotation. In this configuration, all the light beams projected from the LiDAR may be reflected by the mirrors into the opening defined by these mirrors. The light beams may be projected with an angular spread that can overlap with the camera's field of view.

In three dimensions, it may be advantageous for the mirrored surfaces of the reflector to be arranged so they surround the active depth sensor in such a way as to reflect all the beams from the active depth sensor toward the opening in those mirrors. As shown in FIGS. 7A and 7B, two basic designs for a reflector for an active depth sensor may include conical and pyramidal reflectors. In FIG. 7A, a cone-shaped reflector 700 has a surface that is cone-shaped on the inside, with a circular opening 710. In FIG. 7B, a square pyramidal reflector 750 may have four mirrors placed in a pyramid formation with a square opening 760. The square pyramidal reflector 750 may include three or more mirrored sides, with an opening that has the shape of a regular or irregular polygon.

Figure 8A:
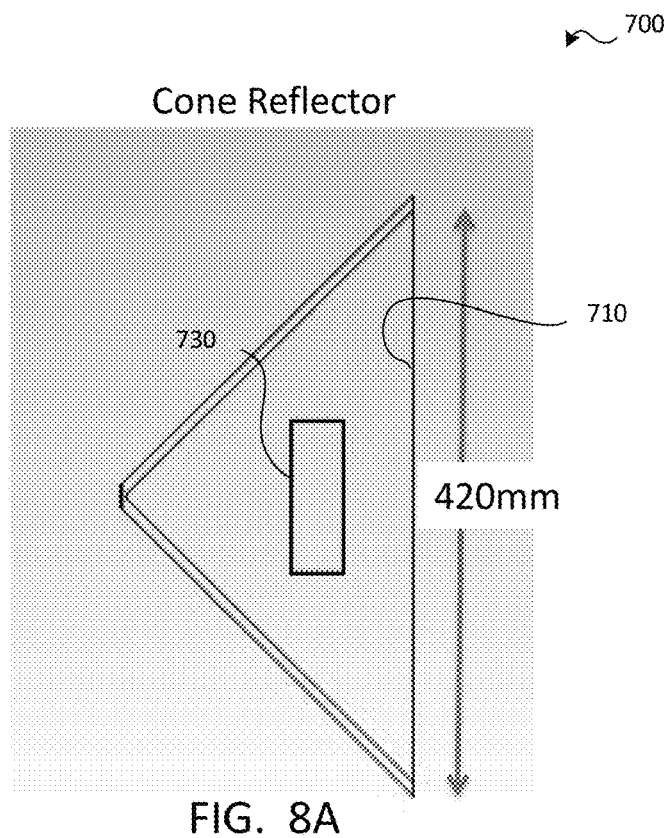
FIGS. 8A and 8B are side elevation, section views depicting the dimension of the opening for the reflected beams of light from, respectively, an active depth sensor utilizing the cone-shaped mirror reflector of FIG. 7A, and an active depth sensor using the pyramidal mirror reflector of FIG. 7B, according to certain embodiments.
Figure 8B:
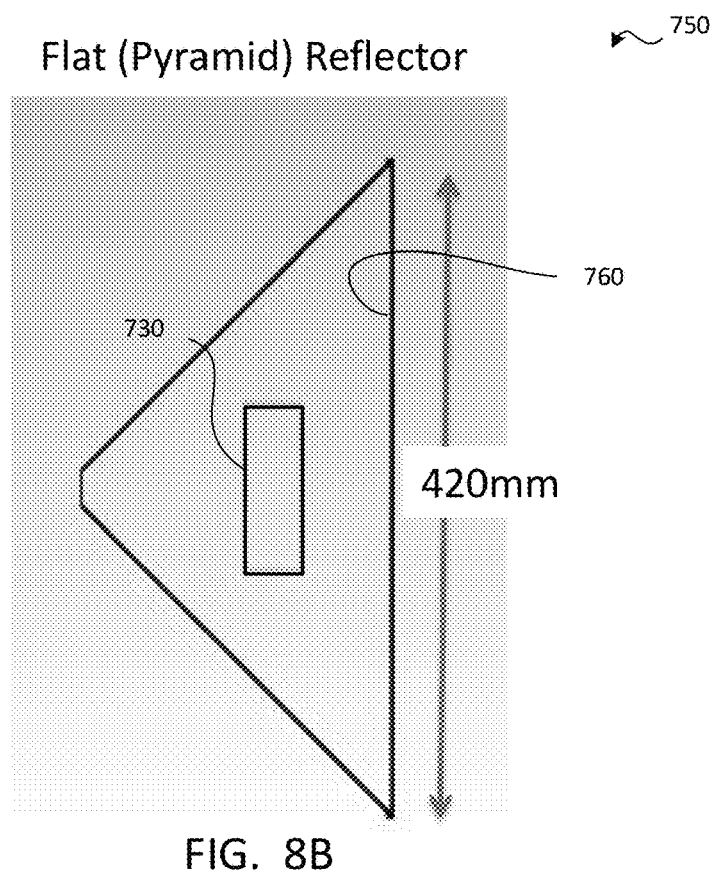

FIGS. 8A and 8B are side elevation, section views depicting exemplary dimensioning for the reflectors of FIGS. 7A and 7B, respectively. In at least one embodiment, the non-mirrored opening 710 in the cone-shaped reflector 700 has a diameter of 420 mm, as shown in FIG. 8A. Further, in at least one embodiment, the non-mirrored opening 760 in the square pyramidal reflector 750 is a square with a side 420 mm in length, as shown in FIG. 8B. Further, in at least one embodiment, the non-mirrored opening 760 is a regular 13-sided polygon called a tridecagon, and the design contains 13 mirrors.

Figure 9A:
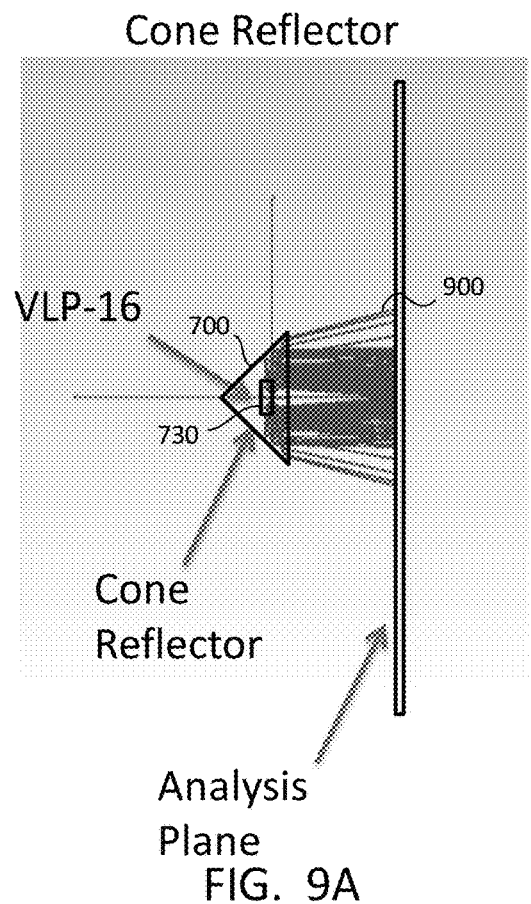
FIGS. 9A and 9B are side elevation, section views depicting laser beams from a LiDAR VLP-16 centered in, respectively, the cone-shaped mirror reflector of FIG. 7A, and an active depth sensor using the pyramidal mirror reflector of FIG. 7B, according to certain embodiments.
Figure 9B:
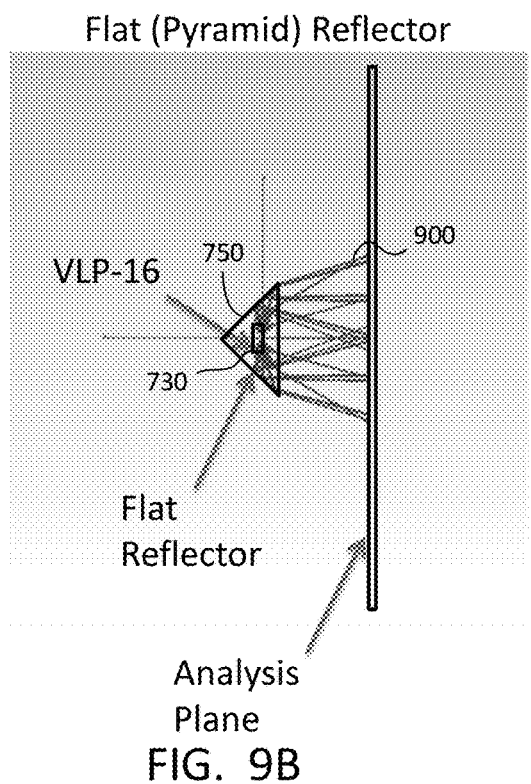

FIGS. 9A and 9B are side elevation, section views depicting exemplary rays projected with use of the reflectors of FIGS. 7A and 7B, respectively. Centered between the mirrors in either the pyramid or conical configuration, the active depth sensor 730 may project rays 900 that are reflected by the walls of the mirror cavity and focused onto a plane perpendicular to the axis of rotation of the active depth sensor 730 as shown in FIGS. 9A and 9B, for the conical reflector 700 and the square pyramidal reflector 750, respectively. This plane perpendicular to axis of rotation of the active depth sensor 730 may advantageously correspond to the field of view of the light-field camera (for example, the light-field camera 540 of FIG. 5) with which the active depth sensor 730 is to be used.

Figure 10:
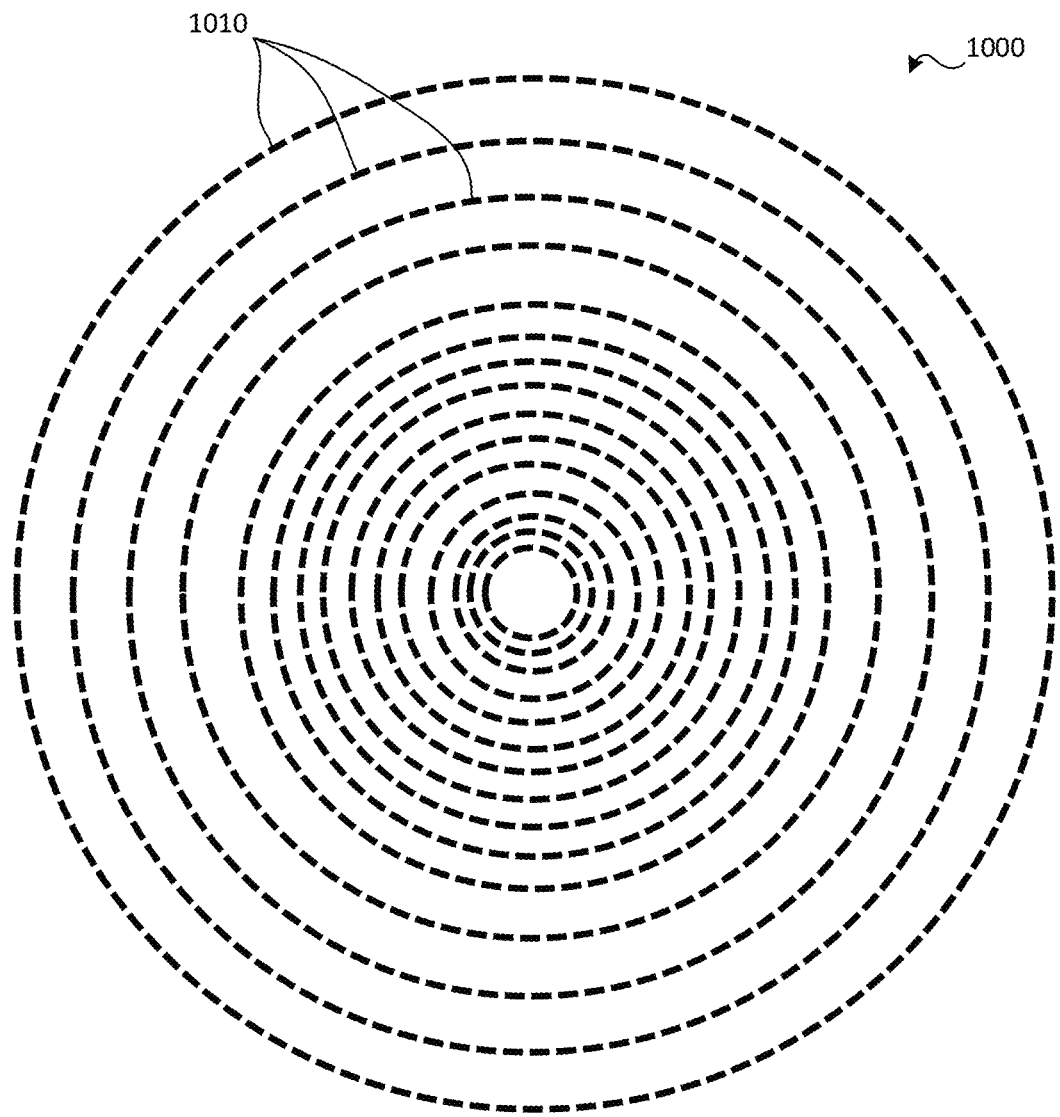
FIG. 10 is a plot depicting the sampling points in an imaging plane perpendicular to the axis of rotation of a Velodyne VLP-16 LiDAR device and a conical mirror reflector design such as the cone-shaped mirror reflector of FIG. 7A, in which the sampling points form a group of 16 concentric circles, with the LiDAR laser beams projected into a field of view of 30°, according to one embodiment.
Figure 11:
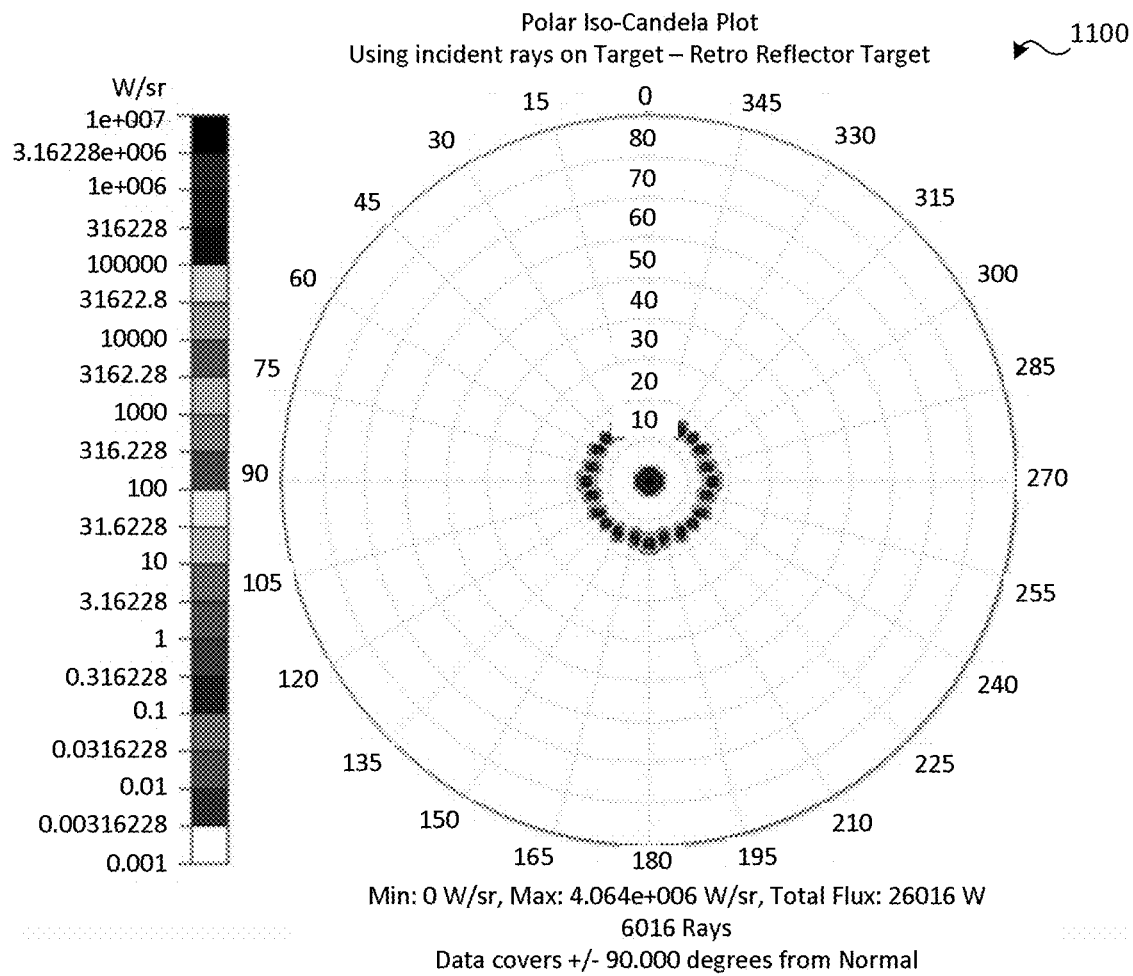
FIG. 11 is a polar plot depicting the projected energy vs. angle distribution, in units of Watts/Steradians (W/sr), for a Velodyne VLP-16 LiDAR device used with a conical mirror reflector design such as the cone-shaped mirror reflector of FIG. 7A, according to one embodiment.

FIG. 10 is a plot depicting the pattern 1000 of sampling points gathered by the active depth sensor 730 when placed within the conical reflector 700 of FIG. 7A. The pattern of sampling points gathered by the active depth sensor 730 may be dependent on the mirror configuration. In at least one embodiment, corresponding to a conical mirror reflector design, and using the Velodyne VLP-16 LiDAR device, the sampling points in an imaging plane perpendicular to the axis of rotation of the LiDAR form the pattern 1000 with sixteen concentric circles 1010, as shown in FIG. 10. The LiDAR laser beams may be projected into a field of view of 30°. FIG. 11 is a polar plot 1100 showing the resulting projected energy vs. angle distribution, in units of Watts/Steradians (W/sr), for the pattern 1000 of sampling points of FIG. 10.

Figure 12:
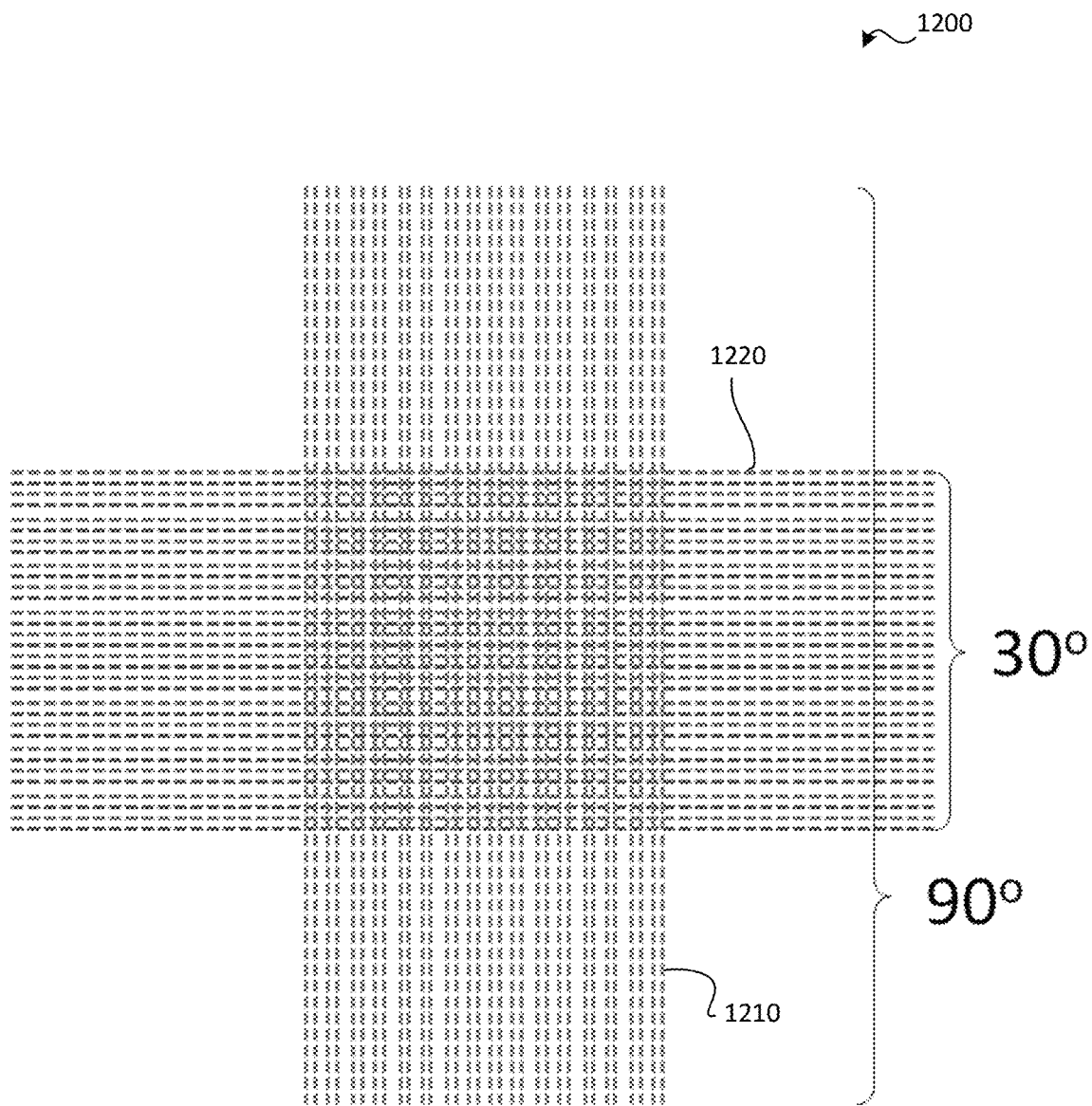
FIG. 12 is a plot depicting the sampling points in an imaging plane perpendicular to the axis of rotation of a Velodyne VLP-16 LiDAR device and a pyramidal mirror reflector design such as the pyramidal mirror reflector of FIG. 7B, in which the sampling points form two rectangular grids, with the LiDAR laser beams projected into a total field of view that is approximately 90° in each dimension, with the overlap between vertical and horizontal scans contained within an approximately 30° field of view, according to one embodiment.
Figure 13:
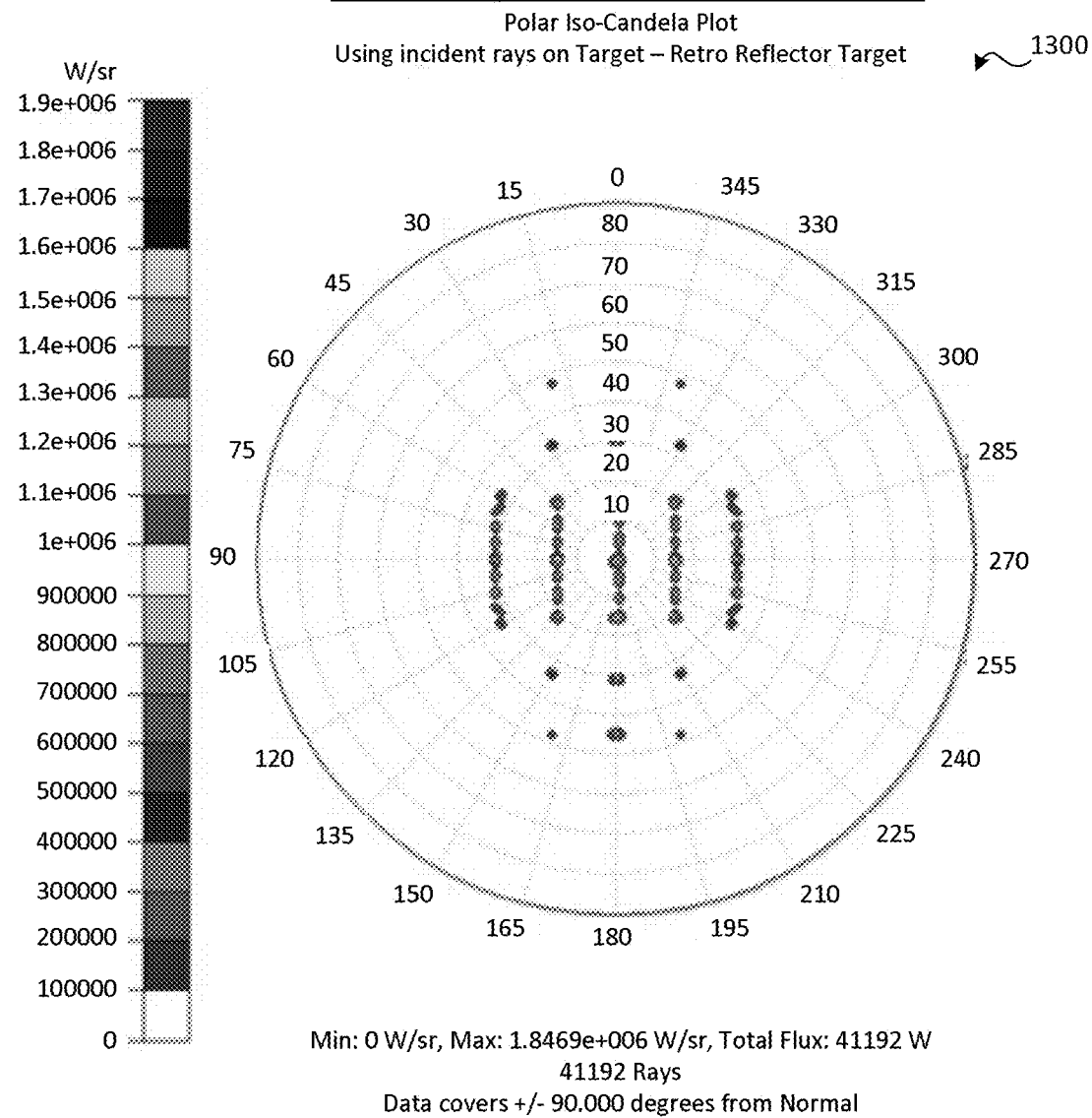
FIG. 13 is a polar plot depicting the projected energy vs. angle distribution, in units of Watts/Steradians (W/sr) for a Velodyne VLP-16 LiDAR device used with a pyramidal mirror reflector design such as the pyramidal mirror reflector of FIG. 7B in which the opening is slightly rectangular, according to one embodiment.

FIG. 12 is a plot depicting the pattern 1200 of sampling points gathered by the active depth sensor 730 when placed within the pyramidal reflector 750 of FIG. 7B. In at least one embodiment, corresponding to a pyramidal mirror reflector design in which the non-mirrored opening is slightly rectangular in shape and using the Velodyne VLP-16 LiDAR device, the sampling points in an imaging plane perpendicular to the axis of rotation of the LiDAR may form the pattern 1200 with a field of view 1210 of 90° in one direction and a field of view 1220 of 30° in the orthogonal direction. Different colors represent samples reflected from different mirrors. The pattern 1200 thus may have a cross pattern with a roughly 90-by-90-degree field of view, and a high resolution central 30-by-30-degree region. FIG. 13 is a polar plot 1300 showing the resulting projected energy vs. angle distribution, in units of Watts/Steradians (W/sr), for the pattern 1200 of sampling points of FIG. 12.

Figure 14A:
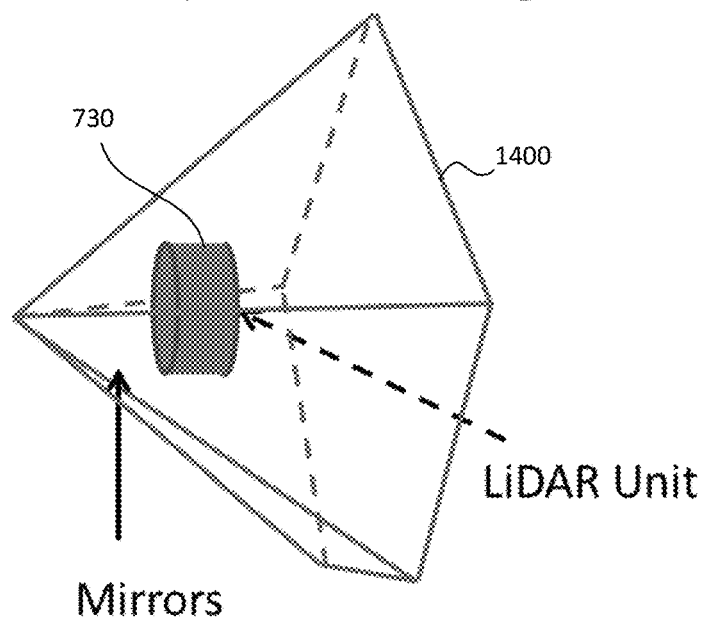
FIG. 14A depicts a multi-faceted reflector, according to one embodiment.

FIG. 14A depicts a multi-faceted reflector 1400, according to another embodiment. The reflector 1400 may have five facets, as shown. However, the multi-faceted reflector 1400 is intended as a generalized example; any number of planar mirrors may be used. Larger numbers of facets may be present, if desired.

Figure 14B:
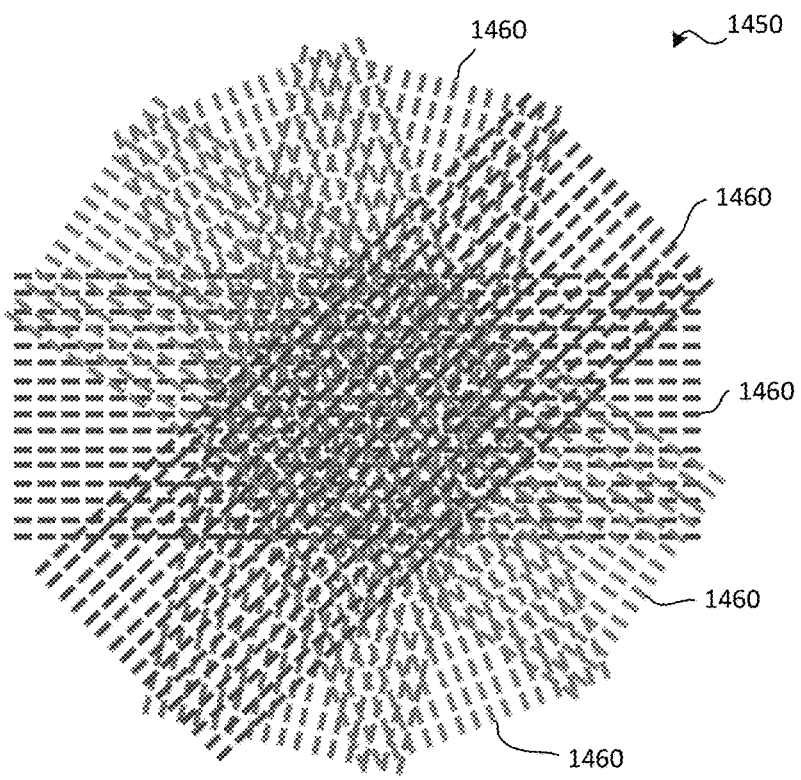
FIG. 14B is a plot depicting the pattern of sampling points gathered by the active depth sensor when placed within the multi-faceted reflector of FIG. 14A.

FIG. 14B is a plot depicting the pattern 1450 of sampling points gathered by the active depth sensor 730 when placed within the multi-faceted reflector 1400 of FIG. 14A. In at least one embodiment, corresponding to a five-faceted reflector in which the non-mirrored opening is pentagonal in shape, the sampling points in an imaging plane perpendicular to the axis of rotation of the LiDAR may form the pattern 1450 with five fields-of-view 1460, displaced from each other in 72° increments.

Figure 15:
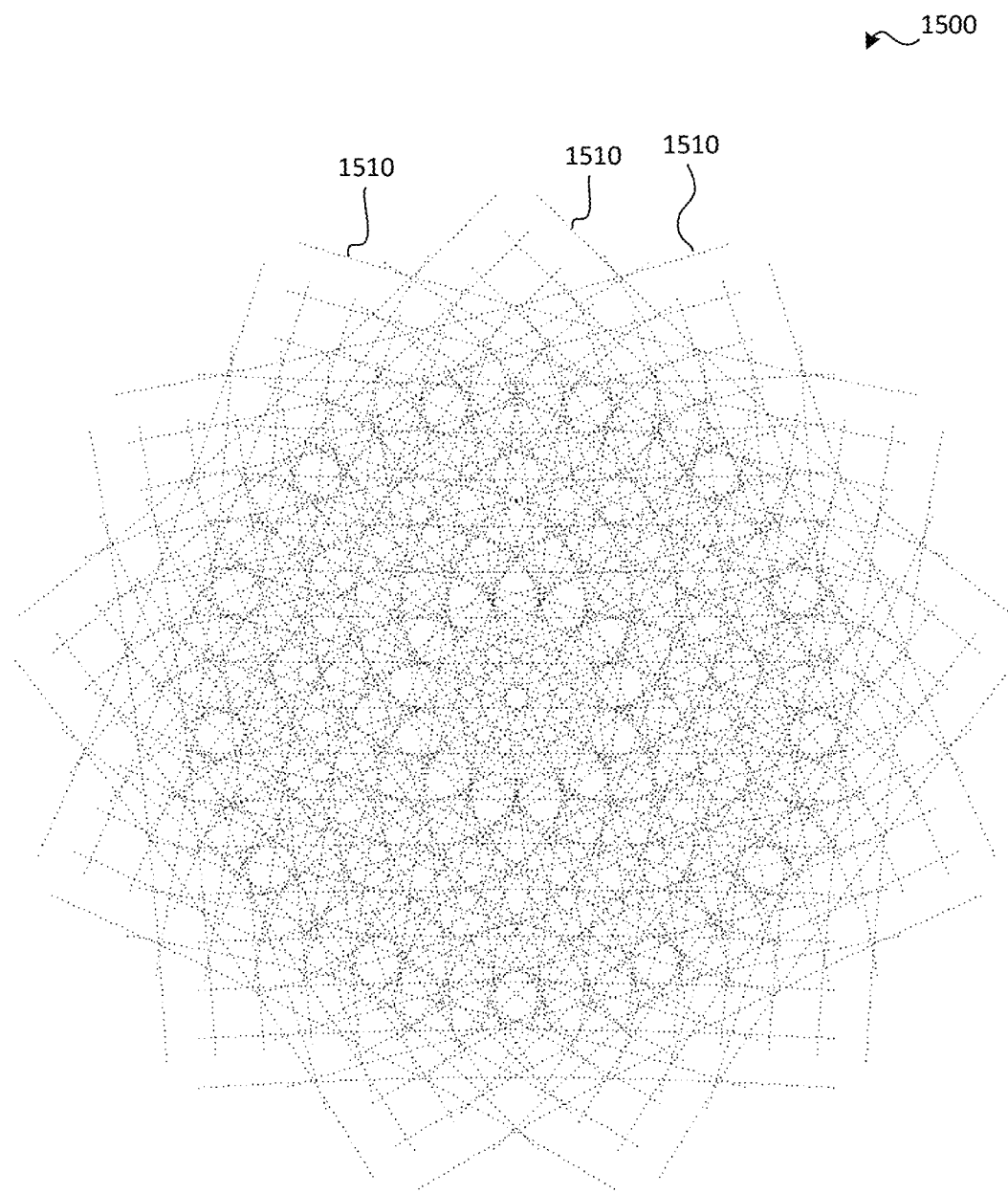
FIG. 15 depicts the sampling points in an imaging plane perpendicular to the axis of rotation of a Velodyne VLP-16 LiDAR device placed within a pyramid reflector design with 13 mirrors and a 13-sided regular polygon opening (tridecagon), in which the LiDAR laser beams are projected into a dense sampling pattern that is mostly contained within a field of view that is approximately 30° in each dimension, according to one embodiment.

FIG. 15 is a plot depicting the pattern 1500 of sampling points gathered by the active depth sensor 730 when placed within a multi-faceted reflector (not shown) with thirteen facets. In at least one other embodiment, corresponding to a regular 13-sided tridecagon pyramidal mirror reflector design, containing 13 mirrors, and using the Velodyne VLP-16 LiDAR device, the sampling points in an imaging plane perpendicular to the axis of rotation of the LiDAR may form a grid with thirteen fields-of-view 1510 of 27.7° in the orthogonal direction.

One advantage of using a configuration with a number of mirrors that is much higher than 4 is that the pattern of sampling points is more evenly distributed across a field of view that is more narrow. For example, in the case of the 13-sided mirror design, the field of view may be 27.7°, compared with a 90° field of view for the 4-sided mirror design. This narrow field of view may better match the field of view of the light-field camera 540, and may thus result in more samples for objects that appear in the light-field images and/or light-field video captured by the light-field camera 540.

Figure 16:
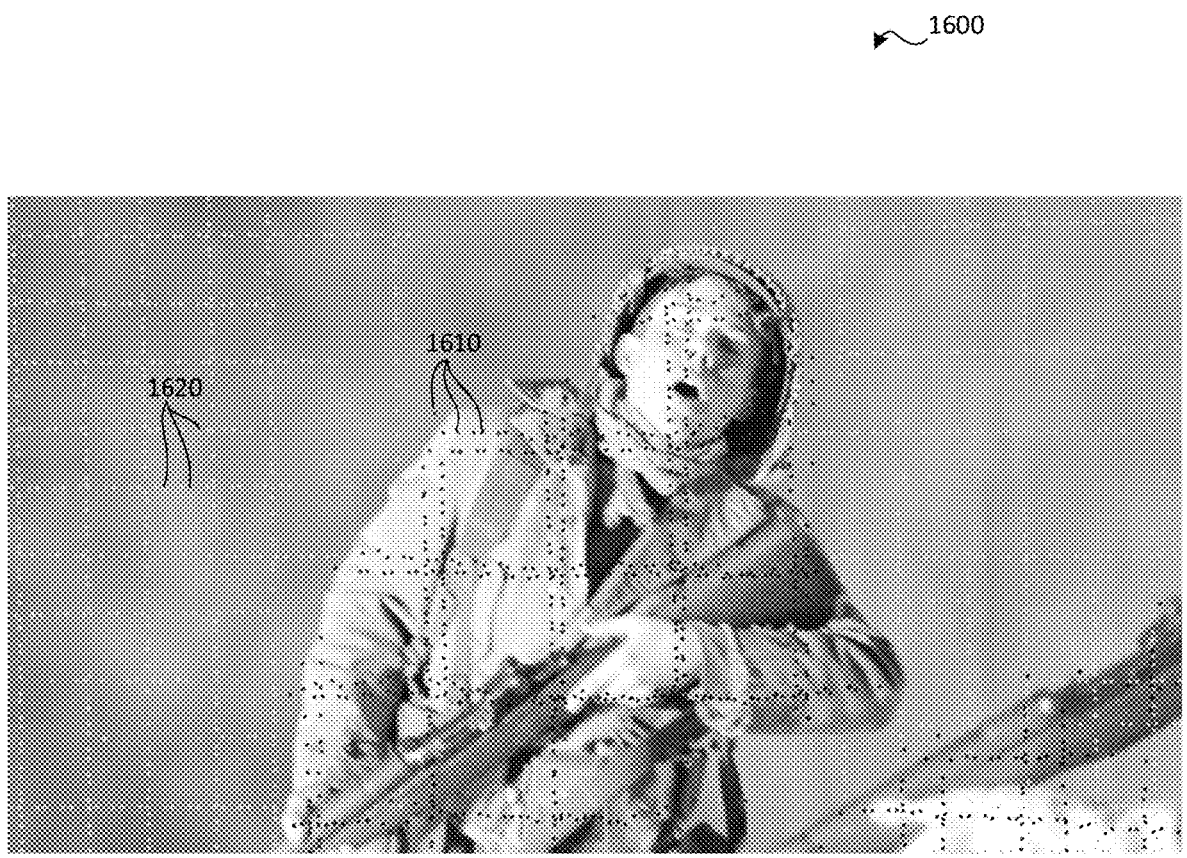
FIG. 16 is an image depicting the LiDAR measurement points for objects in an imaging plane, according to one embodiment.

FIG. 16 is an image 1600 depicting the LiDAR measurement points for objects in an imaging plane, according to one embodiment. The spots 1610 and the spots 1620 on the image 1600 of the soldier represent LiDAR sampling measurement points. Each of the black spots 1610 may designate an intersection of the scanning beam with the foreground object (the soldier), while each of the white spots 1620 may designate the intersection of the scanning beam with the plane in the background.

Active Depth Sensor Data Processing

In at least one embodiment, active depth information is used to augment acquired light-field data, so as to generate better depth maps. First, a correspondence may be generated between the active depth samples and the rays in a light-field image. Then, a depth map generation algorithm may be used to combine the depth information from the active depth sensor with that of the light-field data.

Calibration: Overview

Calibration may be performed to establish a correspondence between an active depth sensor sample in the sensor's coordinates x=(x,y,z) and a pixel in the image space (u,v,λ). In at least one embodiment, the following formula is used to transfer an active depth coordinate to image space:

$$\begin{bmatrix} u \\ v \end{bmatrix} = PTM \begin{bmatrix} x \\ y \\ z \end{bmatrix}$$

$$\lambda = g(z)$$

where M is the mirror reflection transformation, P is the camera intrinsic matrix, T is the active depth sensor to camera transformation matrix, and g is a function that converts the world-space distance z to the lambda space λ.

In at least one embodiment, calibration includes four steps: camera calibration (P), LiDAR-camera calibration (T), depth calibration (g) and, for the case of active depth sensors with cylindrical FOVs, a mirror calibration (M) step. If there is no circular FOV in the active depth sensor, or no mirror or similar systems are used, the mirror calibration step M can be omitted.

Mirror Calibration

In at least one embodiment, mirror calibration involves scanning a rectangular planar board using the mirror system. The board may be rotated about 45° (in plane) relative to the mirror system, so that the active depth sensor scanlines are roughly diagonal across the board. This may be done so that the corners of the board can be computed: when the board is tilted, the end points of the scanlines can be used to compute all four edges of the board and then find the corners. In general, there should be enough active depth sensor scanlines (at least three or four) from each mirror covering the entire board.

Figure 17A:
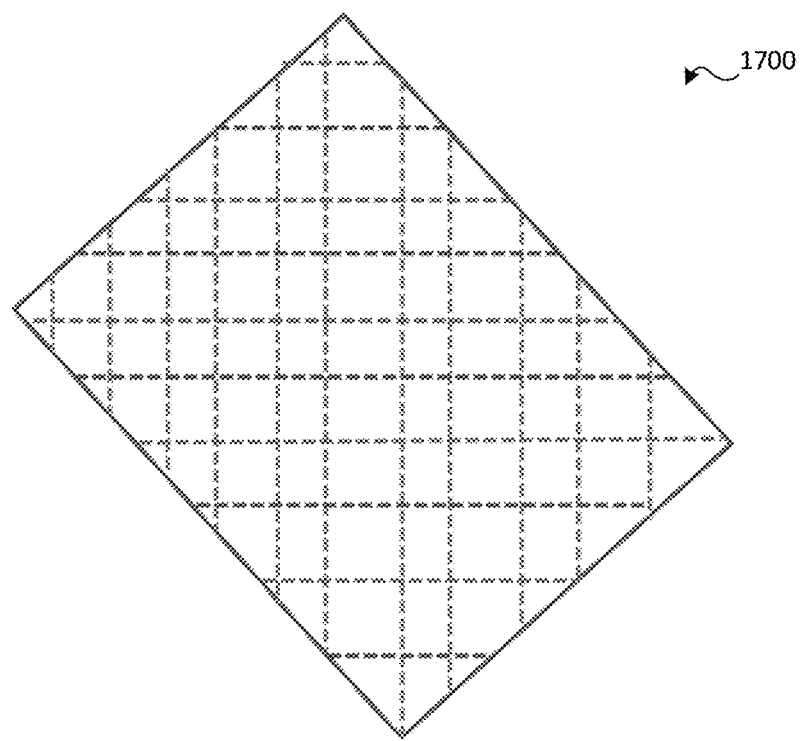
FIG. 17A depicts a planar board and an example of a projected LiDAR sensor pattern from a LiDAR sensor with a circular FOV, according to one embodiment.

FIG. 17A depicts a planar board 1700 and an example of a projected LiDAR sensor pattern from a LiDAR sensor with a circular FOV, according to one embodiment. Different colors represent the reflected LiDAR samples from different mirrors. In at least one embodiment, this process is repeated a few times by changing the distance between the board 1700 and the active depth sensor (which in this example is, once again, a LiDAR sensor with a circular FOV). The mirror calibration may find the plane equations defining the four planar mirrors.

A plane can be represented by $$n \cdot x + w = 0$$

where n is the normalized vector of the plane normal and w is the plane distance to origin. A point x that is reflected by the mirror has a new coordinate x'.

$$x' = x - 2(n \cdot x + w)n = M(n, w, x)$$

where M is the mirror reflection transformation, which depends on the unknown n and w.

Figure 17B:
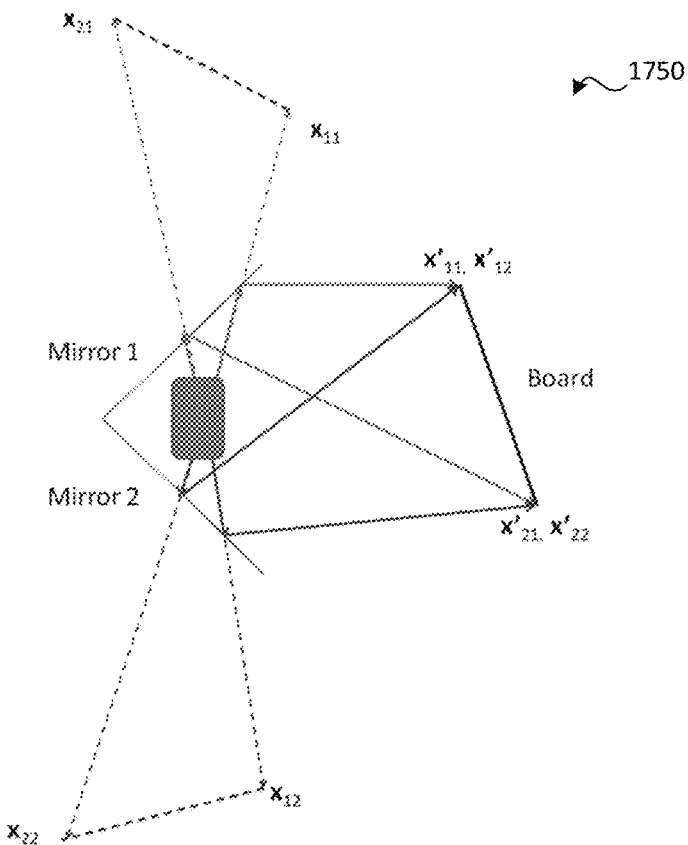
FIG. 17B is a side view depicting alignment of corners in the board of FIG. 17A with each other, as viewed with different mirrors, according to one embodiment.

For each quadrant of LiDAR samples (corresponding to one of the four mirrors), the four corners of the board $x_{ij}$ may be computed, where the subscript i is for the ith corner and j is for the jth mirror. After mirror reflection, each reflected corner $x'_{ij}$ from all four mirrors should align with each other. FIG. 17B illustrates an example of this in a 2D side view 1750.

This yields the following optimization:

$$\{n_k, w_k\}_{k=1,2,3,4} = \operatorname{argmin} \sum_{i=1}^{4} \sum_{j=2}^{4} \|x'_{ij} - x'_{i1}\|^2$$

This is a nonlinear optimization. The gradient may be computed numerically, for example using finite difference. Once the optimization is solved, the four plane equations can transform the LiDAR samples x from the LiDAR space to the LiDAR-mirror space x'.

Camera Calibration

In at least one embodiment, a standard camera calibration process is used to find the intrinsic projection matrix P and the lens distortion parameters (which are usually very small and can be ignored if the image has been undistorted). For example, a chessboard pattern can be captured many times at different locations and/or orientations. During the capture process, it may be preferable for the entire chessboard to be seen in the camera, without necessarily occupying the entire field of view. The images may be captured with focus settings that cause the chessboard to be in focus and sharp. Usually, ten to twenty images are sufficient for one focus distance. In at least one embodiment, separate camera calibrations are performed for different focus distances; linear interpolation may be performed between them to obtain calibrations for intermediate distances.

Active Depth Sensor to Camera Calibration

The purpose of Active Depth Sensor to Camera calibration is to find the relative transformation (rotation R and translation t) between the active depth sensor and the camera. The calibration procedure of this step may be very similar to that of mirror calibration. The difference is that when the planar board is scanned by the active depth sensor, it is also captured as an image by the camera. For each corner of the board $(x_i, y_i, z_i)$ in the active depth sensor space, there is a corresponding pixel for that corner in the image space $(u_i, v_i)$. This formulates another optimization problem:

$$T = \operatorname{argmin} \sum_i \left\| \begin{bmatrix} u_i \\ v_i \end{bmatrix} - PTM \begin{bmatrix} x_i \\ y_i \\ z_i \end{bmatrix} \right\|^2$$

Note that in the above equation, the matrix P is known from the camera calibration step and, for the case of LiDAR sensors (or similar active depth sensors) with circular FOVs, the matrix M is known from the mirror calibration step. The only unknown here is the transformation matrix T=[R t]. This optimization is nonlinear, and can be solved by known nonlinear optimization software.

Depth Calibration

Depth calibration may be used to find the relationship between the distances in the world space and the lambda space. The thin lens equation may provide a suitable starting point:

$$\frac{1}{f} = \frac{1}{z} + \frac{1}{i - \lambda f_{mla}}$$

where f is the focal length of the main lens, $f_{mla}$ is the focal length of the microlens array, or MLA, z is the distance from an object point to the main lens, and i is the distance between the main lens and MLA, which may be given by the readings of the focus motor.

Figure 18:
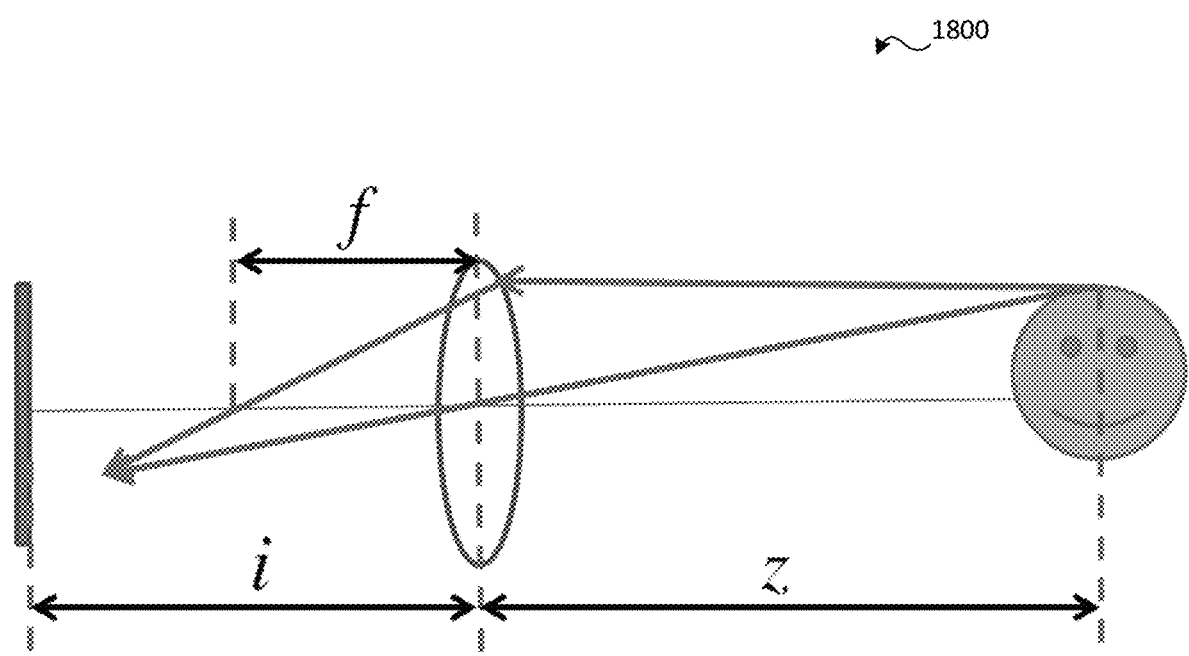
FIG. 18 is a representation of the thin lens equation, according to one embodiment.

FIG. 18 is a representation 1800 of the thin lens equation (set forth above), according to one embodiment. The representation 1800 depicts relative positions between a main lens 1810, a microlens array (MLA) 1820, and a subject 1830 to be captured.

After mathematical derivations, the following two formulas may convert the distance from the world space (z) to the lambda space (λ) and vice versa:

$$\lambda = \frac{i - \frac{zf}{z-f}}{f_{mla}}$$

$$z = \frac{f(i - \lambda f_{mla})}{i - \lambda f_{mla} - f}$$

Depth Fusion Between Active Depth Sensor Data and Light-Field

In at least one embodiment, active depth sensor data is combined with light-field data to generate a more accurate depth map, using the following three steps:
1. Data cost function creation;
2. Data cost function massage; and
3. Application of a solver such as Markov Random Field (MRF).

In the first step, a 3D data cost function $C(u,v,\lambda)$ may be created based on multi-view geometry, using, for example, a function in a light-field pipeline. Intuitively, the data cost function may indicate how unlikely the depth is equal to $\lambda$ at pixel $(u,v)$. The larger the cost, the less likely that the depth is equal to $\lambda$.

In the second step, the data cost function may be modified (improved) using heuristics. In at least one embodiment, a cross-based aggregation heuristic is used, which indicates that two adjacent pixels with similar color probably have similar depth.

The last step is a global optimization to find the depth map $\lambda(u,v)$, using a solver such as an MRF solution. This optimization may have two objectives: a per-pixel data cost that minimizes $C(u,v,\lambda)$, and a smoothness cost that minimizes the variation of depth among adjacent pixels.

To fuse active depth sensor data, an additional step can be added between the first and second steps set forth above. After the cost volume has been created from light-field data, the value may be modified to accommodate the active depth sensor samples. After each active depth sensor sample $(x_i, y_i, z_i)$ is converted to the image space $(u_i, v_i, \lambda_i)$ using the calibration results, the data cost volume may be modified as follows:

$$C(u_i, v_i, \lambda) = w|\lambda - \lambda_i|$$

where w is the weight that specifies the influence of the active depth sensor data.

Two other possible alternatives are quadratic cost:

$$C(u_i, v_i, \lambda) = w(\lambda - \lambda_i)^2$$

and the delta cost:

$$C(u_i, v_i, \lambda) = \begin{cases} 0 & \text{if } \lambda = \lambda_i; \\ \infty & \text{otherwise} \end{cases}.$$

Results

Figure 19:
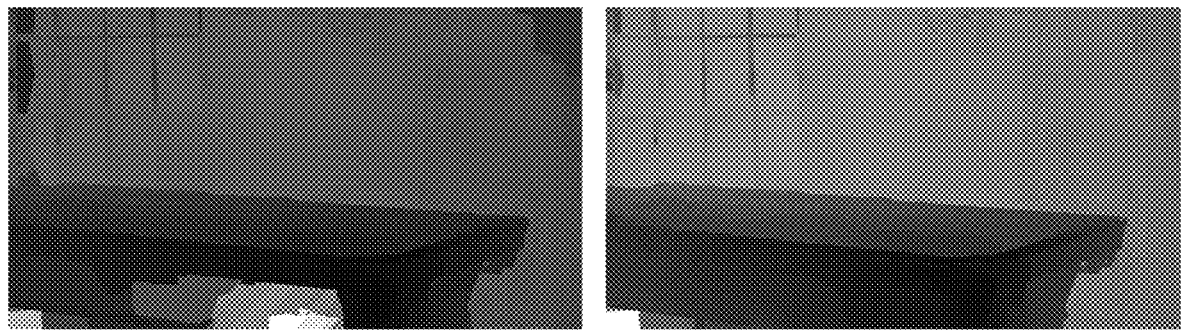
FIG. 19 depicts comparisons between depth maps generated using the light-field data alone and those generated by combining the data from a LiDAR sensor with a circular FOV with the depth information obtained from the light-field data, according to one embodiment.
Figure 19:
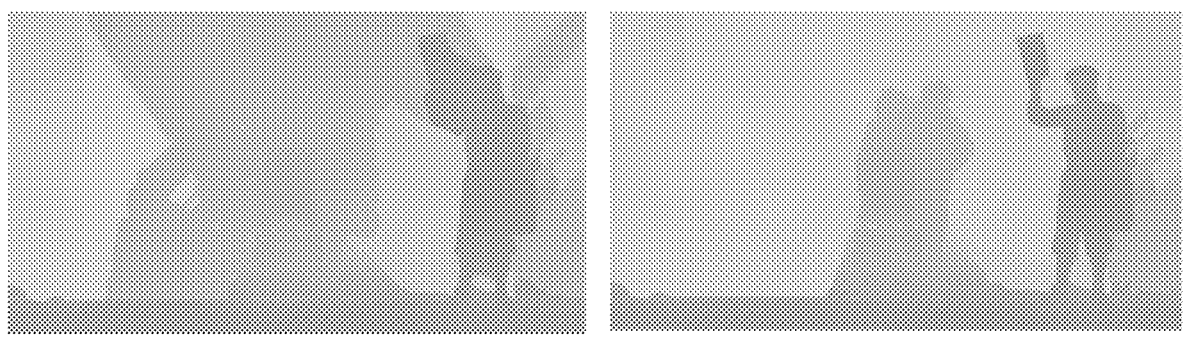
Figure 19:
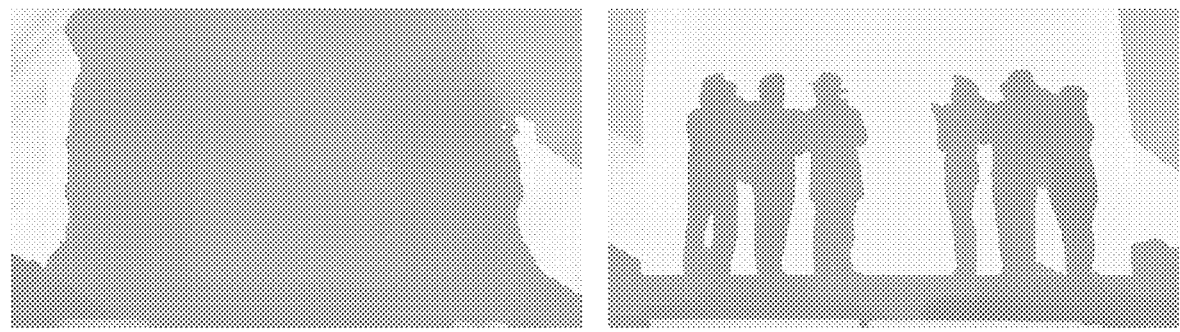

The above pipeline can greatly improve the quality of depth maps. FIG. 19 depicts comparisons 1900 between depth maps generated using the light-field data alone and those generated by combining the data from a LiDAR sensor with a circular FOV with the depth information obtained from the light-field data, according to one embodiment. In each case, the left-hand image is the depth map generated using the light-field data alone, and the right-hand drawing depicts a depth map generated by combining LiDAR depth data and light-field depth data.

Variations

In various embodiments, the techniques described herein can be used in connection with different active depth sensing technologies in addition to (or instead of) LiDAR or ToF cameras. According to some examples, forward-facing LiDAR sensors such as Solid State LiDAR sensors may be used.

In various embodiments, the depth calibration process can involve a space different from the lambda space or if the cost volume is generated in world coordinates, such depth calibration step can be omitted. Those of skill in the art will recognize that various other aspects of the systems and methods may be utilized, within the scope of the present disclosure.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for measuring depths of at least one object in a scene, the method comprising:
   with a light-field camera, capturing a light-field image of the scene;
   with a depth sensor, capturing depth sensor data of the scene;
   extracting light-field depth data from the captured light-field image;
   combining the extracted light-field depth data with the captured depth sensor data to generate a depth map indicative of distance between the light-field camera and each object in the scene by:
      calibrating the light-field camera, depth sensor, or both to generate a correspondence between the sensor depth data and the light-field image, wherein calibrating the light-field camera, depth sensor, or both comprises:
         with the depth sensor, capturing depth calibration data of a calibration scene containing a planar board positioned at one or more known orientations;
         capturing light-field calibration data of the calibration scene contemporaneously with capture of the depth calibration data;

using the depth calibration data to ascertain locations of corners of the planar board in each of one or more known orientations; and establishing settings for the light-field camera in which the corners in the light-field calibration data are aligned with the corners in the depth calibration data;

creating a 3D data cost function indicating a likelihood of a depth for at least a portion of the scene based on multi-view geometry;

applying cross-based aggregation heuristics to improve the 3D data cost function; and applying at least one of local and global optimization to generate the depth map; and outputting the generated depth map.

2. The method of claim 1, wherein:
the depth sensor comprises an active depth sensor;
the method further comprises, prior to capturing the depth sensor data, transmitting electromagnetic energy toward the scene with the active depth sensor; and
capturing the depth sensor data comprises:
receiving the electromagnetic energy after reflection of the electromagnetic energy off of the scene; and
based on receipt of the electromagnetic energy, generating the depth sensor data.

3. The method of claim 2, wherein the active depth sensor comprises a LiDAR sensor.

4. The method of claim 2, wherein the active depth sensor comprises a Time of Flight sensor.

5. The method of claim 2, wherein:
the active depth sensor has a 360° field of view;
transmitting the electromagnetic energy toward the scene comprises:
with the active depth sensor, emitting electromagnetic energy generally radially outward from the active depth sensor; and
with one or more mirrors, reflecting the emitted electromagnetic energy toward the scene; and
receiving the electromagnetic energy comprises, with the one or more mirrors, reflecting the emitted electromagnetic energy generally radially inward toward the active depth sensor.

6. The method of claim 5, wherein the one or more mirrors are arranged to define a conical shape.

7. The method of claim 5, wherein the one or more mirrors are arranged to define a pyramidal shape.

8. The method of claim 5, wherein the one or more mirrors are arranged to define a multi-faceted shape comprising more than four facets.

9. The method of claim 1, wherein using the light-field depth data and the depth sensor data to generate the depth map further comprises applying a depth map generation algorithm to combine the sensor depth data with the light-field depth data.

10. The method of claim 1, wherein using the light-field depth data and the depth sensor data to generate the depth map further comprises: modifying the 3D data cost function to accommodate a plurality of depth sensor samples from the depth sensor data of the scene.

11. A non-transitory computer-readable medium for measuring depths of at least one object in a scene, comprising instructions stored thereon, that when executed by a processor, perform the steps of:
receiving a light-field image of a scene, wherein the light-field image has been captured with a light-field camera;

receiving depth sensor data of the scene, wherein the depth sensor data has been captured with a depth sensor;

extracting light-field depth data from the captured light-field image;

combining the extracted light-field depth data with the captured depth sensor data to generate a depth map indicative of distance between the light-field camera and each object in the scene by:
calibrating the light-field camera, depth sensor, or both to generate a correspondence between the sensor depth data and the light-field image, wherein calibrating the light-field camera, depth sensor, or both comprises:
with the depth sensor, capturing depth calibration data of a calibration scene containing a planar board positioned at one or more known orientations;
capturing light-field calibration data of the calibration scene contemporaneously with capture of the depth calibration data;
using the depth calibration data to ascertain locations of corners of the planar board in each of one or more known orientations; and
establishing settings for the light-field camera in which the corners in the light-field calibration data are aligned with the corners in the depth calibration data;
creating a 3D data cost function based on multi-view geometry;
applying cross-based aggregation heuristics to improve the 3D data cost function; and
applying at least one of local and global optimization to generate the depth map; and
outputting the generated depth map.

12. The non-transitory computer-readable medium of claim 11, wherein using the light-field depth data and the depth sensor data to generate the depth map further comprises: modifying the 3D data cost function to accommodate a plurality of depth sensor samples from the depth sensor data of the scene.

13. A system for measuring depths of at least one object in a scene, the system comprising:
a light-field camera configured to capture a light-field image of the scene;
a depth sensor configured to capture depth sensor data of the scene; and
a processor, communicatively coupled to the light-field camera and the depth sensor, configured to:
extract light-field depth data from the captured light-field image; and
combine the extracted light-field depth data with the captured depth sensor data to generate a depth map indicative of distance between the light-field camera and each object in the scene by:
calibrating the light-field camera, depth sensor, or both to generate a correspondence between the sensor depth data and the light-field image, wherein calibrating the light-field camera, depth sensor, or both comprises:
with the depth sensor, capturing depth calibration data of a calibration scene containing a planar board positioned at one or more known orientations;
capturing light-field calibration data of the calibration scene contemporaneously with capture of the depth calibration data;

using the depth calibration data to ascertain locations of corners of the planar board in each of one or more known orientations; and establishing settings for the light-field camera in which the corners in the light-field calibration data are aligned with the corners in the depth calibration data;

creating a 3D data cost function indicating a likelihood of a depth for at least a portion of the scene based on multi-view geometry;

applying cross-based aggregation heuristics to improve the 3D data cost function; and applying at least one of local and global optimization to generate the depth map; and an output device, communicatively coupled to the processor, configured to output the generated depth map.

14. The system of claim 13, wherein:

the depth sensor comprises an active depth sensor;

the active depth sensor comprises an emitter configured, prior to capture of the depth sensor data, to transmit electromagnetic energy toward the scene with the active depth sensor; and the active depth sensor is further configured to capture the depth sensor data by:

receiving the electromagnetic energy after reflection of the electromagnetic energy off of the scene; and based on receipt of the electromagnetic energy, generating the depth sensor data.

15. The system of claim 14, wherein the active depth sensor comprises at least one of a LiDAR sensor and a Time of Flight sensor.

16. The system of claim 14, wherein:

the active depth sensor is configured to transmit the electromagnetic energy toward the scene by, with the emitter, emitting electromagnetic energy generally radially outward; and the active depth sensor further comprises:

a sensor with a 360° field of view; and one or more mirrors positioned proximate the active depth sensor to reflect the emitted electromagnetic energy toward the scene, and to reflect the emitted electromagnetic energy generally radially inward toward the sensor after the emitted electromagnetic energy has reflected off the scene.

17. The system of claim 16, wherein the one or more mirrors are arranged to define a conical shape.

18. The system of claim 16, wherein the one or more mirrors are arranged to define a pyramidal shape.

19. The system of claim 16, wherein the one or more mirrors are arranged to define a multi-faceted shape comprising more than four facets.

20. The system of claim 13, wherein the depth sensor further comprises:

a sensor; and one or more mirrors that reflect electromagnetic energy to and/or from the sensor;

wherein the depth sensor is calibrated to generate the correspondence via calibration of the one or more mirrors.

21. The system of claim 13, wherein the processor is further configured to use the light-field depth data and the depth sensor data to generate the depth map by: modifying the 3D data cost function to accommodate a plurality of depth sensor samples from the depth sensor data of the scene.

* * * * *